US011157133B2

(12) United States Patent
Kim et al.

(10) Patent No.: US 11,157,133 B2
(45) Date of Patent: Oct. 26, 2021

(54) METHOD AND PORTABLE TERMINAL HAVING BENDED DISPLAY UNIT AND COVER FOR EXECUTING APPLICATION

(71) Applicant: SAMSUNG ELECTRONICS CO., LTD., Suwon-si (KR)

(72) Inventors: So-young Kim, Suwon-si (KR); Joon-young Lee, Seoul (KR); Moon-joo Lee, Suwon-si (KR); Shi-yun Cho, Anyang-si (KR)

(73) Assignee: SAMSUNGN ELECTRONICS CO., LTD., Suwon-si (KR)

(*) Notice: Subject to any disclaimer, the term of this patent is extended or adjusted under 35 U.S.C. 154(b) by 799 days.

(21) Appl. No.: 14/835,862

(22) Filed: Aug. 26, 2015

(65) Prior Publication Data

US 2016/0062600 A1 Mar. 3, 2016

(30) Foreign Application Priority Data

Sep. 2, 2014 (KR) .................. 10-2014-0116488
Apr. 10, 2015 (KR) .................. 10-2015-0050954

(51) Int. Cl.
*G06F 3/0481* (2013.01)
*G06F 3/0488* (2013.01)
(Continued)

(52) U.S. Cl.
CPC ........ *G06F 3/04817* (2013.01); *G06F 1/1626* (2013.01); *G06F 1/1643* (2013.01);
(Continued)

(58) Field of Classification Search
CPC .. G06F 3/04817; G06F 1/1626; G06F 1/1652; G06F 1/1643; G06F 3/0482;
(Continued)

(56) References Cited

U.S. PATENT DOCUMENTS 6,009,338 A 12/1999 Iwata et al.
6,208,879 B1 3/2001 Iwata et al.
(Continued)

FOREIGN PATENT DOCUMENTS

CN 1592323 A 3/2005
CN 103970575 A 8/2014
(Continued)

OTHER PUBLICATIONS

International Search Report dated Dec. 18, 2015 issued by International Searching Authority in counterpart International Application No. PCT/KR2015/009184.
(Continued)

*Primary Examiner* — Jennifer N To
*Assistant Examiner* — Parmanand D Patel
(74) *Attorney, Agent, or Firm* — Sughrue Mion, PLLC

(57) ABSTRACT

A portable terminal apparatus includes a bended display including a front display area and a side display area, and a controller that displays a UI element corresponding to an application on a side display area of the bended display if the cover is closed, and in response to a touch with respect to at least one UI element from among the UI elements and an opening of the cover being detected, executes an application corresponding to a UI element with the detected touch, and controls the bended display so that an execution screen of the application is displayed on the front display area.

4 Claims, 12 Drawing Sheets

(51) Int. Cl.
*G06F 3/0482* (2013.01)
*G06F 1/16* (2006.01)

(52) U.S. Cl.
CPC .......... *G06F 1/1652* (2013.01); *G06F 3/0482* (2013.01); *G06F 3/0488* (2013.01); *G06F 2200/1634* (2013.01); *G06F 2203/04803* (2013.01)

(58) Field of Classification Search
CPC ......... G06F 3/0488; G06F 2203/04803; G06F 2200/1634; G06F 3/482
See application file for complete search history.

(56) References Cited

U.S. PATENT DOCUMENTS

| | | |
|---|---|---|
| 6,535,749 B1 | 3/2003 | Iwata et al. |
| 7,069,056 B2 | 6/2006 | Iwata et al. |
| 7,884,808 B2 | 2/2011 | Joo |
| 8,723,824 B2 | 5/2014 | Myers et al. |
| 8,954,887 B1* | 2/2015 | Tseng ................. G06F 3/04812 |
| | | 715/808 |
| 8,976,141 B2 | 3/2015 | Myers et al. |
| 2003/0008679 A1 | 1/2003 | Iwata et al. |
| 2006/0148531 A1 | 7/2006 | Iwata et al. |
| 2008/0129647 A1 | 6/2008 | Canova |
| 2008/0223708 A1 | 9/2008 | Joo |
| 2013/0033434 A1* | 2/2013 | Richardson ........... G06F 3/0488 |
| | | 345/173 |
| 2013/0038636 A1 | 2/2013 | Fujiwaka |
| 2013/0076649 A1 | 3/2013 | Myers et al. |
| 2013/0120447 A1* | 5/2013 | Kim ........................ G06T 11/60 |
| | | 345/629 |
| 2013/0178248 A1* | 7/2013 | Kim .................... H04M 1/0268 |
| | | 455/566 |
| 2013/0241839 A1 | 9/2013 | Walker et al. |
| 2013/0300697 A1* | 11/2013 | Kim ..................... G06F 3/0488 |
| | | 345/173 |
| 2014/0068518 A1* | 3/2014 | Liu ....................... G06F 3/0488 |
| | | 715/835 |
| 2014/0164957 A1 | 6/2014 | Shin et al. |
| 2014/0191926 A1 | 7/2014 | Mathew et al. |
| 2014/0191980 A1 | 7/2014 | Mulabagal et al. |
| 2014/0191981 A1 | 7/2014 | Ramasarma et al. |
| 2014/0198036 A1 | 7/2014 | Kim et al. |
| 2014/0240289 A1 | 8/2014 | Myers et al. |
| 2014/0313119 A1* | 10/2014 | Cho .................... G06F 3/04883 |
| | | 345/156 |
| 2015/0026623 A1* | 1/2015 | Horne ................. G06F 3/04847 |
| | | 715/771 |
| 2015/0130767 A1 | 5/2015 | Myers et al. |
| 2015/0227227 A1 | 8/2015 | Myers et al. |
| 2017/0097715 A1* | 4/2017 | Kim .................... H04M 1/0266 |

FOREIGN PATENT DOCUMENTS

| | | |
|---|---|---|
| CN | 104081345 A | 10/2014 |
| CN | 104601761 A | 5/2015 |
| KR | 10-2008-0084497 A | 9/2008 |
| KR | 1020130081617 A | 7/2013 |
| KR | 1020130127050 A | 11/2013 |
| KR | 10-2014-0066253 A | 5/2014 |
| KR | 10-2014-0092059 A | 7/2014 |
| TW | 200623792 A | 7/2006 |
| TW | 201430693 A | 8/2014 |
| WO | 2013/073898 A1 | 5/2013 |
| WO | 2015/009597 A1 | 1/2015 |

OTHER PUBLICATIONS

Written Opinion dated Dec. 18, 2015 issued by International Searching Authority in counterpart International Application No. PCT/KR2015/009184.
Communication dated Feb. 10, 2016 issued by European Patent Office in counterpart European Application No. 15182978.5.
Communication dated Apr. 22, 2015, issued by the Korean Intellectual Property Office in counterpart Korean Application No. 10-2014-0116488.
Communication dated Mar. 20, 2019, issued by the Taiwan Patent Office in counterpart Taiwan Application No. 104126917.
Communication dated Oct. 11, 2019 issued by the State Intellectual Property Office of P.R. China in counterpart Chinese Application No. 201510551169.0.
Communication dated Oct. 18, 2019 , issued by the Korean Intellectual Property Office in counterpart Korean Application No. 10-2015-0050954.
Communication dated Jan. 27, 2020, issued by the Indian Patent Office in counterpart Indian Application No. 3216/MUM/2015.

* cited by examiner

METHOD AND PORTABLE TERMINAL HAVING BENDED DISPLAY UNIT AND COVER FOR EXECUTING APPLICATION

CROSS-REFERENCE TO RELATED APPLICATIONS

This application claims priority from Korean Patent Application No. 10-2015-0050954, filed on Apr. 10, 2015, and Korean Patent Application No. 10-2014-0116488, filed on Sep. 2, 2014, in the Korean Intellectual Property Office, the entire disclosures of which are hereby incorporated by reference in their entireties.

BACKGROUND

1. Field

Apparatuses and methods consistent with exemplary embodiments relate to a portable terminal having a bended display with a front display area and a side display area, and a cover, and a method for executing the application, and more particularly, to an apparatus and a method for selecting a UI element which is displayed on a side display area in the bended display, detecting an opening of a cover, and executing an application corresponding to the selected UI element.

2. Description of the Related Art

Due to the advancement of digital technology, portable terminals are able to communicate and process personal information while being transported anywhere. For example, portable terminal devices such as a Personal Digital Assistant (PDA), an electronic scheduler, a smartphone, a tablet Personal Computer (PC), and the like, are available for transport. The portable terminals may perform functions such as making voice calls, transmitting messages (e.g., Short Message Service (SMS), Multimedia Message Service (MMS)), making video calls, electronic scheduling, photographing, exchanging emails, replaying a broadcast, using the Internet, replaying music, schedule management, Social Networking Service (SNS), messenger, dictionary, game, and the like.

Due to the fragile nature of display screens, covers have been developed to protect a display of a portable terminal. In this case, according to opening/closing of a cover, a display area of the display can be turned ON or OFF.

While the display of the portable terminal is covered by the cover, a user may need to open the cover in order to execute an application of a portable terminal, which may be inconvenient for the user.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a portable terminal which may expand a display area to a side part as well as a front part by embodying a bended display and a screen display control method thereof.

One or more exemplary embodiments may divide a bended display into a front display area and a side display area from a portable terminal having a bended display, and provide multi-tasking which may concurrently display two or more applications by using the front display area and the side display area.

One or more exemplary embodiments may provide a cover which can cover the front display area of the bended display, and provide a method for executing an application according to opening/closing of a cover and user interaction in the side display area of the bended display.

According to an aspect of an exemplary embodiment, there is provided a method for executing an application of a portable terminal having a bended display with a front display area and a side display area, the method including: while the front display area is covered by a cover, displaying a user interface (UI) on the side display area; detecting a touch of at least one UI element of the displayed UI and detecting an opening of the cover; and executing the application corresponding to the UI element based on the detected touch and the opening of the cover, and displaying an execution screen of the executed application on the front display area.

The UI element may be an icon for executing the application.

The method may include, in response to detecting another touch of a plurality of UI elements and detecting the opening of the cover, executing a plurality of applications corresponding to the plurality of UI elements, and displaying an execution screen for each application from among the plurality of applications on the front display area.

The execution screen for each application from among the plurality of applications may be displayed in a plurality of windows, respectively.

The method may include, in response to detecting an opening of the cover while a first application is executed in the portable terminal, concurrently displaying, on the front display area, an execution screen of the first application and an execution screen of a second application that corresponds to the UI element with the detected touch.

The method may include, in response to detecting the opening of the cover while the first application is being executed, displaying a first execution screen of the first application on the side display area, and displaying a second execution screen of the second application that corresponds to the UI element of the detected touch on the front display area.

According to an aspect of another exemplary embodiment, there is provided a method of executing an application of a portable terminal having a bended display with a front display area and a side display area, the method including: displaying an execution screen of a first application on the front display area; determining whether the front display area is covered by a cover: and displaying, on the side display area, a first user interface (UI) element that corresponds to the first application based on the cover being covered.

At least one additional UI element that corresponds to a pre-executed application may be aligned and displayed in the side display area according to a temporal order of execution, and the first UI element that was executed most recently may also be aligned and displayed.

The method may include, in response to detecting a touch on a UI element displayed in the side display area being maintained for a predetermined time, displaying a menu item on the side display area corresponding to the UI element with the detected touch.

The method may include detecting an opening of the cover while a touch is detected on a menu item; and executing a function of the application which corresponds to the menu item based on the opening of the cover.

According to an aspect of another exemplary embodiment, there is provided a portable terminal apparatus including: a bended display including a front display area and a side display area; and a controller configured to: display a user interface (UI) on the side display area if in response to the front display area being covered by a cover, and in response to detecting a touch of at least one UI element displayed on the UI and detecting an opening of the cover, execute an application corresponding to the UI element, and control the bended display so that an execution screen of the executed application is displayed on the front display area.

The UI element may be an icon for executing the application.

The controller may be further configured to, in response to detecting a touch on a plurality of UI elements and detecting the opening of the cover, execute a plurality of applications corresponding to the plurality of UI elements with the detected touch, and display an execution screen for each application from among the plurality of applications on the front display area.

The execution screen for each application from among the plurality of applications may be displayed in a plurality of windows, respectively.

The controller may be further configured to, in response to detecting an opening of the cover while a first application is executed in the portable terminal, concurrently display, on the front display area, an execution screen of the first application and an execution screen of a second application that corresponds to the UI element with detected touch.

The controller may be further configured to, in response to detecting the opening of the cover while the first application is being executed, display the execution screen of the first application on the side display area, and display the execution screen of a second application that corresponds to the UI element with the detected touch on the front display area.

According to an aspect of another exemplary embodiment, there is provided a portable terminal apparatus including: a bended display including a front display area and a side display area; and a controller configured to: control the bended display to display an execution screen of a first application on the front display area, and in response to detecting a cover on the front display area, display a first UI (user interface) element that corresponds to the first application on the side display area.

The controller may be further configured to control the bended display so that at least one additional UI element that corresponds to a pre-executed application may be aligned and displayed in the side display area according to a temporal order of execution, and the first UI element that was executed most recently may also be aligned and displayed.

The controller may be further configured to, in response to detecting a touch on a UI element being maintained for a predetermined time, display a menu item on the side display area corresponding to the UI element with the detected touch.

The controller may be further configured to, in response to detecting an opening of the cover while a touch is detected on a menu item, execute a function of the application corresponding to the menu item.

According to an aspect of another exemplary embodiment, there is provided a portable apparatus including: a display including a front display area and a side display area, wherein the display is configured to bend along a line between the front display area and the side display area; a controller configured to: in response to detecting that a cover is closed, display at least one user interface (UI) element in the side display area; and in response to detecting a touch input of the UI element and detecting an opening of the cover, display an execution screen corresponding to the UI element with the detected touch input on the front display area.

The controller may be further configured to, in response to an application being executed in the portable apparatus before detecting the touch input on the UI element, display a plurality of execution screens on the front display area, wherein a first execution screen corresponds to the application and a second execution screen corresponds to the UI element with the detected touch input.

The UI element may include at least one of an icon for executing an application, a graphic or text indicating information regarding an execution result of the application, and a notification message.

If the UI element is a notification message, the UI element may include an e-mail message received by the portable apparatus.

The one or more exemplary embodiments may be embodied by all types of portable terminals and devices corresponding thereto. In addition, one or more exemplary embodiments may contribute to improve usability, convenience, and competitiveness of a portable terminal by realizing an optimal environment for outputting event information by states of the portable terminal.

BRIEF DESCRIPTION OF THE DRAWINGS

The above and/or other aspects will be more apparent from the following detailed description of exemplary embodiments taken in conjunction with the accompanying drawings, in which.

DETAILED DESCRIPTION OF EXEMPLARY EMBODIMENTS

Figure 1:
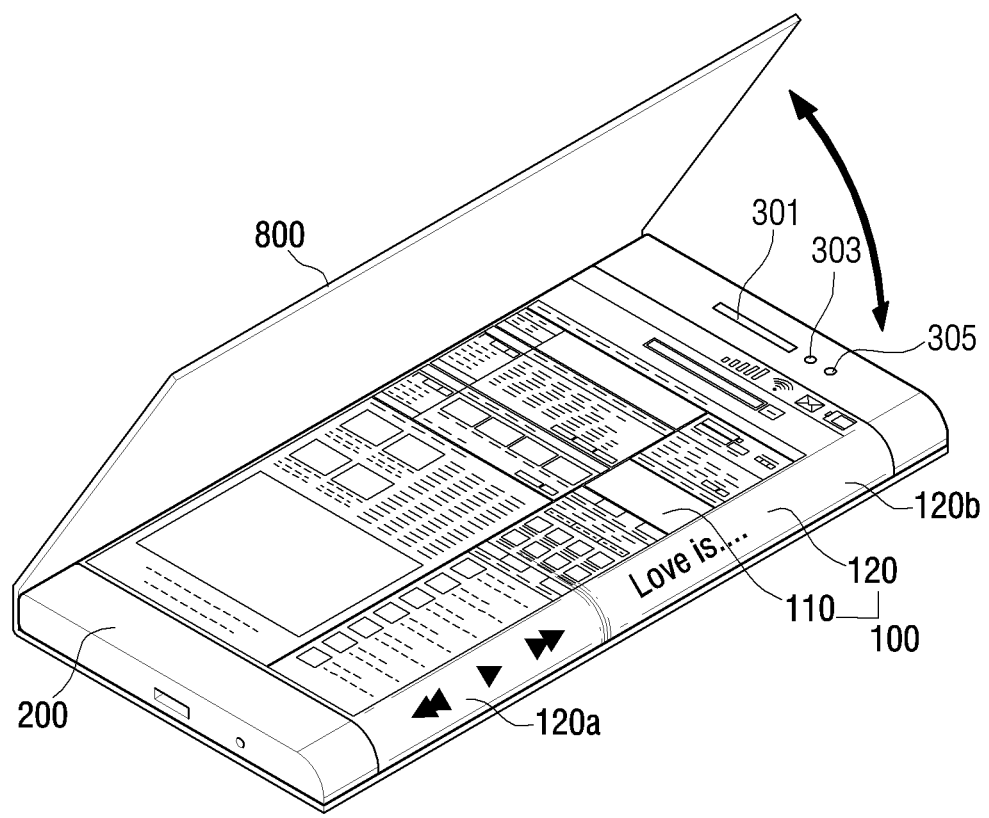
FIG. 1 is a view illustrating an example of a portable terminal having a cover and a bended display according to an exemplary embodiment.
Figure 1:
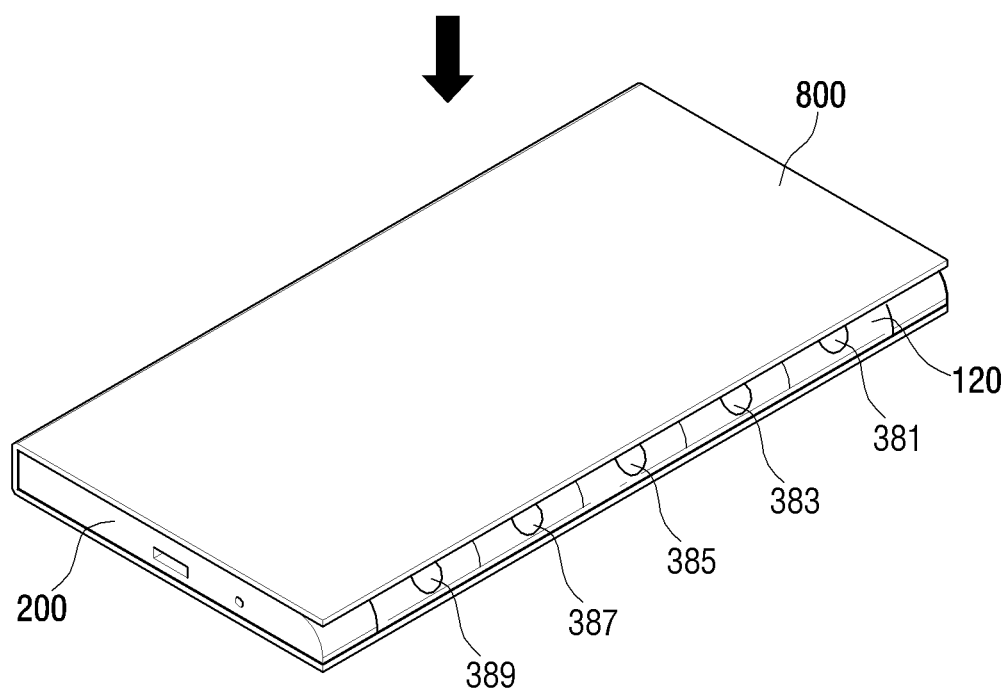

Below, terms used in describing one or more exemplary embodiments will be briefly explained, and exemplary embodiments will be described in greater detail with reference to the accompanying drawings.

Although terms used in the exemplary embodiments are general terms, which are widely used in the present time considering the functions in the present disclosure, the terms may be changed depending on an intention of a person skilled in the art, a precedent, and introduction of new technology. In addition, in a special case, terms selected by the applicant may be used. In this case, the meaning of the terms will be explained in detail in the corresponding detailed descriptions. Therefore, the terms used in the exemplary embodiments should be defined based on the meaning thereof and the descriptions of the present disclosure, rather than based on their names only.

Although exemplary embodiments are illustrated in the drawings and detailed descriptions are provided, changes can be made and one or more exemplary embodiments may be provided. Accordingly, exemplary embodiments are not limited and should be construed as including all changes and/or equivalents or substitutes included in the ideas and technological scopes of exemplary embodiments. In the following description, well-known functions or constructions may not be described in detail if it would obscure the description with unnecessary detail.

Although terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items. Expressions such as "at least one of," when preceding a list of elements, modify the entire list of elements and do not modify the individual elements of the list.

As used herein, the singular forms are intended to include the plural forms as well, unless the context clearly indicates otherwise. The terms "include" or "comprise" used in exemplary embodiments indicate the presence of disclosed corresponding features, numbers, steps, operations, elements, parts or a combination thereof, and do not limit additional one or more features, numbers, steps, operations, elements, parts, or a combination thereof.

"Module" or "Unit" used in exemplary embodiments perform at least one function or operation and may be implemented by using hardware or software, or a combination of hardware and software. In addition, a plurality of "modules" or a plurality of "units" may be integrated into at least one module and implemented by using at least one processor, except for "modules" or "units" which may need to be implemented by using hardware.

It should be understood that, when an element is mentioned as being "connected" to another element, the element may be "directly connected" to another element, and may be "electrically connected" to another element with an intervening element between the element and another element. It will be further understood that, when an element "includes" another element, the term "include" does not preclude the presence or addition of one or more other elements.

Hereinafter, exemplary embodiments will be described in greater detail with reference to the accompanying drawings. The matters defined in the description, such as detailed construction and elements, are provided to assist in a comprehensive understanding of the exemplary embodiments. However, it should be apparent that exemplary embodiments can be carried out by those of ordinary skill in the art without those specifically defined matters. In the description of the exemplary embodiment, detailed explanations of related art may be omitted. In the explanation of the drawings, similar reference numerals are used for similar elements.

The term "cover" used in exemplary embodiments may be an object or a device for protecting a display by covering a part or an entirety of a display area of the portable terminal device. The cover may be electrically or non-electrically connected with the portable terminal device. In addition, the cover may be connected with the portable terminal device for communication. The cover may be removably mounted to the portable terminal device or removable from the portable terminal device and thus may be separately provided, or may be integrated into the portable terminal device.

The term "user input" in exemplary embodiments may include at least one of a touch input, a bending input, a deformation input, a voice input, a button input, and a multimodal input, but it is not limited to these.

The term "touch input" in exemplary embodiments may refer to a touch gesture which is performed by a user on a display and a cover to control a device. In addition, "touch input" may include a touch which is not in contact with the display and is distanced away from the display by more than a predetermined distance (e.g., floating or hovering). The touch input may include at least one of a touch and hold gesture, a tap gesture which touches and then removes the touch, a double tap gesture, a panning gesture, a flick gesture, and a touch and drag gesture which touches and then moves in one direction while still touching, a pinch gesture, and the like, but is not limited to these.

The term "button input" in exemplary embodiments may refer to an input of a user to control a device by using a physical button attached to the device.

The term "motion input" in exemplary embodiments may refer to motion which is made by a user of a device to control the device. For example, the motion input may include a user motion of rotating a device, a user motion of tilting a device, and a user motion of moving a device vertically and horizontally.

The term "multi-input" in exemplary embodiments may refer to a combination of two or more input methods. For example, a device may receive a touch input and a motion input of a user, and may receive a touch input and a voice input of a user.

The term "application" in exemplary embodiments may refer to a set of computer programs designed to perform a function. There may be one or more applications in exemplary embodiments. For example, the application may include a game application, a moving image replay application, a map application, a memo application, a calendar application, a phone book application, a broadcast application, an exercise support application, a payment application, a photo folder application, and the like, but it is not limited these.

The term "application identification information" in exemplary embodiments may be unique information for distinguishing one application from another application. For example, the application identification information may include an icon, an index item, link information, and the like, but is not limited these.

The term "User Interface (UI) element" in exemplary embodiments may refer to an element that can interact with a user and thus provide visual, auditory, or olfactory feedback according to a user input. The UI element may be represented in the form of at least one of an image, a text, and a moving image. An area that does not display the above-described information but can provide feedback according to a user input may be referred to as a UI element. For example, the UI element may be the above-described application identification information. In addition, the UI element may be information provided to a user according to an event that happens.

According to an exemplary embodiment, a window may indicate split screens. For example, "two windows" may indicate that one window is split into two screens.

Also, "concurrently" can be interpreted to mean "having portions temporally overlapped."

Below, a configuration of the portable terminal and a method of executing an application will be described according to an exemplary embodiment with reference to the drawings.

FIG. 1 is a view illustrating an example of a portable terminal having a cover and a bended display according to an exemplary embodiment.

As illustrated in FIG. 1, the portable terminal includes a bended display 100, a main body 200 on which the bended display 100 is provided and coupled, and an auxiliary device that is formed in the main body 200 to perform one or more functions of the portable terminal. In FIG. 1, the auxiliary device may include a speaker 301, a microphone, a sensor module (e.g., an illuminance sensor 303, a front camera module 305, etc.), and a physical button, etc.

The bended display 100 may refer to a display apparatus which may be bent, and is designed to be bent or rolled without damage through a paper-like thin and flexible substrate. The bended display 100 may use a plastic substrate instead of a glass substrate, which is generally used. Thus, a processor which is manufactured at a low temperature may be used instead of using a former processor to prevent the substrate from being damaged. The bended display 100 may include a liquid crystal display (LCD), a light emitting diode (LED), an organic LED (OLED), an active matrix OLED (AMOLED) and the like, with a plastic film. Therefore, the bended display 100 may be thin and light and resistant to a shock. Because the flexible display can be bent, curved, deformed or crooked as described above, it may be manufactured in many ways.

According to an exemplary embodiment, the bended display 100 may have an active matrix screen with a screen size (e.g., 3 inches, 4 inches, 4.65 inches, 5 inches, 6.5 inches, 8.4 inches, and the like) according to the size of the portable terminals, and may be extended to at least one side surface of the portable terminals (e.g., a surface of at least one of the left side, right side, upper side, and lower side). The bended display 100 may be folded to have a radius (e.g., 5 cm, 1 cm, 7.5 mm, 5 mm, 4 mm, etc.) of curvature lower than a radius of curvature allowable in the bended display and may be connected with the side surface of the main body 200. A display area which is displayed on a front part of the bended display 100 may be referred to as a front display area 110, and a display area which is extended from the front display area and is bent toward at least one side of the main body 200, and is displayed on a side of the main body 200 may be referred to as a side display area 120.

According to an exemplary embodiment, the front display area 110 and the side display area 120 are divided, and the front display area 110 and the side display area 120 have a shape in which an end portion of the at least one of the above areas has a bent shape, and the bendable at least one end can be a bended display 100 which is extended to at least one side of the portable terminal. In addition, the bendable at least one end portion can be a bended display 100 which is extended to a back part of the portable terminal.

Accordingly, a front area which is a flat surface with respect to the front part of the portable terminal may be called a front display area 110, and a display area formed on a side with respect to the front part of the portable terminal may be called a side display area 120. In other words, according to an exemplary embodiment, a bended display 100 in which the front display area 110 on the front part of the portable terminal and the side display area 120 on the side of the portable terminal are configured to be "integral."

According to an exemplary embodiment, while the portable terminal is in a multi-tasking mode, the portable terminal may display a screen for executing an application which is in a multi-tasking mode by using the front display area 110 and the side display area 120.

For example, as illustrated in FIG. 1, when a web browser application and a music application are executed in a multi-tasking mode, a web browsing screen may be displayed on the front display area 110, and a control button 120a for controlling a music player and a title 120b of music which is being played can be displayed on the side display area 120. Accordingly, a user may raise a volume of the music which is currently playing or may change music which is currently playing to different music using the side display area 120, while listening to music. In addition, a user may browse the internet using the front display area 110 while listening to music.

When a gallery application and a music player application are executed in a multi-tasking mode, a photo may be displayed on the front display area 110, and a control button for controlling a music player may be displayed in the side display area 120. Accordingly, a user may raise a volume of the music which is currently playing or change the music which is currently playing to different music using the side display area 120, while listening to music. In addition, a user may view a photo displayed in the front display area 110 while listening to music.

As illustrated in FIG. 1, the bended display 100 may be divided into a front display area 110 on the front part and the side display area 120 on the side part. The portable terminal may provide a UI element (user interface element) using the side display area 120. The UI element may include at least one of an icon for executing an application, a graphic and a character for providing a user with information, etc.

According to an exemplary embodiment, a screen for executing an application may be displayed on the front display area 110 of the portable terminal. In addition, on the side display area, the portable terminal may display UI elements related to the application, e.g., icons 381, 383, 385, 387, and 389. Also, on the side display area of the portable terminal, a notification message may be displayed when a notification event occurs.

The cover 800 can be detachably coupled to the portable terminal, and can be opened or closed by a user. The cover may cover the front display area. While the cover is closed, the front display area is not exposed to outside, but the side display area can be exposed to outside. When the cover is closed, the portable terminal may receive a user input in the side display area which is not covered by the cover, and display a function or information responding to a user input on the side display area. The lower figure in FIG. 1 illustrates a state in which the cover 800 is closed. When the cover 800 is closed, the portable terminal displays UI elements 381, 383, 385, 387, and 389 on the side display area 120. FIG. 1 illustrates that the UI element is an icon, but it is not limited thereto. A user may execute a desired application or perform a function of a desired application by touching a UI element displayed on the side display area.

When the cover is opened or closed, a value of an electrical signal which is output from a sensor module can change, and the controller may determine an 'opening' or 'closing' state of the cover from the value of the electrical signal output from the sensor module. For example, when the cover is opened, the value "1" can be output in the sensor module, and when the cover is closed, the value "0" can be output in the sensor module. Opening and closing of the cover may be detected by an illuminance sensor 305, a proximity sensor and/or a hall sensor. If the cover has a magnet, the portable terminal may detect the opening/closing of the cover and a degree of the opening/closing of the cover using the hall sensor.

Figure 2:
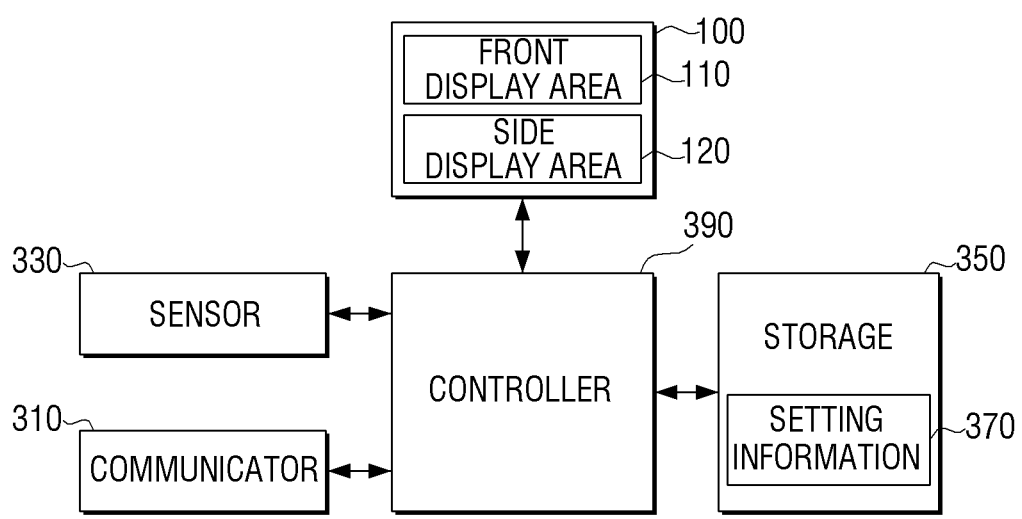
FIG. 2 is a view illustrating a configuration of a portable terminal according to an exemplary embodiment.

FIG. 2 is a view illustrating a configuration of a portable terminal according to an exemplary embodiment. Referring to FIG. 2, a communication module 310 (e.g., communicator), the bended display 100, a sensor module 330 (e.g., sensor), a storage 350, and a controller 390 are included. The portable terminal may further include an audio processor having a microphone and a speaker, a digital broadcast module (e.g., digital multimedia broadcasting (DMB) or digital video broadcasting (DVB)), a camera module for photographing a static video and/or a dynamic video of an object, at least one near field communication module for supporting communication function based on a wireless communication such as Bluetooth communication, infrared data association (IrDA) communication, radio frequency identification (RFID) communication, and near field communication (NFC), input unit for supporting input based on a hard key, and a battery for supplying power to the above configurations can be further included.

The communication module 310 supports communication with an external server or other portable terminals through a communication network. The communication module 310 may include a radio frequency (RF) module for supporting a mobile communication service such as a voice call based on mobile communication, video call, and data communication. The communication module 310 may support Internet communication service such as voice call, video call, and data communication based on internet protocol (IP). The communication module 310 may receive a notification event from an external server or other portable terminals. However, the communication module 310 is not limited to a specific communication module or a communication method.

The bended display 100 may display a screen according to an operation state of the portable terminal. For example, the bended display 100 may display execution screens according to execution of a home screen, menu screen, call sending/receiving screen, message writing/receiving screen, chatting screen, and application, etc.

The bended display 100 is divided into the front display area 110 and the side display area 120, and may display a UI element on the side display area 120. The UI element may be event information according to a notification event such as receiving a call, receiving a message, receiving information according to a push service, and receiving information according to SNS, etc. According to an exemplary embodiment, the UI element may be a part of an execution screen according to an icon for executing an application, and a result of executing an application. An example of an operation of the side display area 120 of the bended display 100 will be described below.

According to an exemplary embodiment, an LCD may be used as the bended display 100, but other display devices such as LED, OLED, and AMOLED may also be used. The bended display 100 may be configured to include an interface which supports input based on a touch. For example, the bended display 100 may support user inputs based on touch through a touch-screen configuration, generate an input signal according to a user input, and transmit the signal to the controller 390. Further, the bended display 100, in displaying various screens, may support displaying a screen in a horizontal mode according to a rotation direction (or a disposition direction) of the portable terminal, displaying a screen in a vertical mode, and displaying an adaptive screen change according to changes between a horizontal mode and a vertical mode.

The sensor module 330, according to an exemplary embodiment, may detect the opening/closing of the cover and/or changes according to a degree of the opening/closing, and transmit the corresponding value, i.e., the electrical signal to the controller 390. In addition, the sensor module 330 may detect changes such as at least one of a change in a posture of the portable terminal, a change in an illumination level, and a change in acceleration, etc., and transmit the corresponding value, i.e., the electrical signal to the controller 390.

The sensor module 330 may be composed of sensors, and when operating a portable terminal (or based on a user setting), power may be supplied to at least one sensor which is set according to the control of the controller 390 and detect opening/closing of the cover and/or changes in a state.

According to an exemplary embodiment, the sensor module 330 may include a sensing device that can detect changes in the portable terminal according to the opening/closing of the cover and/or degree thereof. For example, the sensor module 330 may include at least one sensor such as a hall sensor, an acceleration sensor, a Gyro sensor, an illuminance sensor, a proximity sensor, a pressure sensor, a noise sensor (e.g., a microphone), a video sensor (e.g., a camera module), and a timer, etc.

According to an exemplary embodiment, a state in which the front display area 110 is covered by the cover 800 of the portable terminal may be detected by combining at least one of the illuminance sensor, proximity sensor, and hall sensor.

In other words, according to an exemplary embodiment, opening/closing of the cover and/or the degree of the opening/closing can be detected by using one or more sensors.

Referring to FIG. 2, the sensor module 330 may be an illuminance sensor and may supply power according to the control of the controller 390, and output different values according to the opening/closing of the cover and/or a degree thereof.

The storage 350 (e.g., memory) stores applications and data which are processed in the portable terminal, and may be configured with non-volatile memory and/or volatile memory. The storage 350 may include at least one of Read Only Memory (ROM), flash memory, Random Access Memory (RAM), Hard Disk Drive (HDD), external hard disk, and external storage medium. The storage 350 may detect and continuously or temporarily save the operating system of the portable terminal, programs and data related to the control operation of the bended display 100, closing/opening and degree there of the cover 800 using the sensor module 330, and a state of the portable terminal, and the like. The storage 350 may store the setting information 370 related to the operation of the front display area 110 and the side display area 120 of the bended display 100.

The controller 390 controls overall operations of the portable terminal. According to an exemplary embodiment, the controller 390 may display an application execution screen on the front display area and the side display area according to the opening/closing of the cover or a degree thereof. The application execution screen may be a screen which is displayed according to an execution result of the application.

The controller 390, while the front display area of the bended display is covered, may control the bended display so that at least one UI element corresponding to the application is displayed on the side display area of the bended display. In other words, on the side display area, only one UI element may be displayed or a plurality of UI elements can be displayed. The controller may detect a touch on at least one UI element from among the UI elements, and may execute an application corresponding to the at least one UI element with the detected touch according to an opening of the cover. The controller 390 may control the bended display so as to display the execution screen of the application on the front display area. The UI element may be an icon for executing the application.

According to an exemplary embodiment, the controller, when a touch is detected on a plurality of UI elements, and an opening of the cover is detected, may control the bended display to execute a plurality of applications corresponding to the plurality of UI elements with the detected touch, and display a plurality of application execution screens on the front display area. The plurality of application execution screens may be displayed on a plurality of windows.

Further, the controller, when the first application is executed before the cover is opened, may control the bended display so that the execution screen of the second application, which corresponds to the UI element with the detected touch, and the execution screen of the first application which is being executed are concurrently displayed on the front display area.

According to an exemplary embodiment, the controller, when the first application is executed before the cover is opened in the portable terminal, may control the bended display to display the execution screen of the first application which is executed on the side display area, and display the execution screen of the second application which corresponds to the selected UI element on the front display area.

Further, the controller may control the bended display to display the execution screen of the first application on the front display area of the bended display including the front display area and the side display area, display the UI element corresponding to the application on the side display area of the bended display, detect the front display area is covered by the cover, and display the first UI element corresponding to the first application on the side display area.

According to an exemplary embodiment, the controller may control the bended display to align and display the UI element in the side display area in a temporal order in which the application is executed, and align the first UI element so that the most recently executed UI is aligned.

According to an exemplary embodiment, the controller may control the bended display, when a touch is detected from one UI element, to detect a duration time of the touch, and when the duration time of the touch is more than a predetermined time, display the menu item of the application corresponding to the UI element with the detected touch on the side display area.

According to an exemplary embodiment, the UI element may be aligned and displayed on the side display area in a temporal order in which the application is executed, and the first UI element may be aligned and displayed so that the most recently executed one in a temporal order is aligned and displayed.

According to an exemplary embodiment, the controller 390, when an application is executed, may control the operation and display of the screen. The controller 390 may receive an input signal corresponding to touch interaction inputs supported by the touch-based input interface and control operation of the functions according thereto. The controller 390 may control receiving data and sending data based on a wired communication or a wireless communication.

According to an exemplary embodiment, the portable terminal of FIG. 2 may include an information communication device, a multimedia device, and an application device thereof. For example, the portable terminal may include not only the mobile communication terminal which operates based on communication protocols corresponding to communication systems, but also tablet PC (Personal computer), smart phone, digital camera, PMP (Portable Multimedia Player), media player, portable game terminal, and PDA (Personal Digital Assistant).

FIGS. 3 to 10 are views illustrating an application execution method according to use interactions in the side display area of the portable terminal having the bended display and the opening/closing state.

Figure 3:
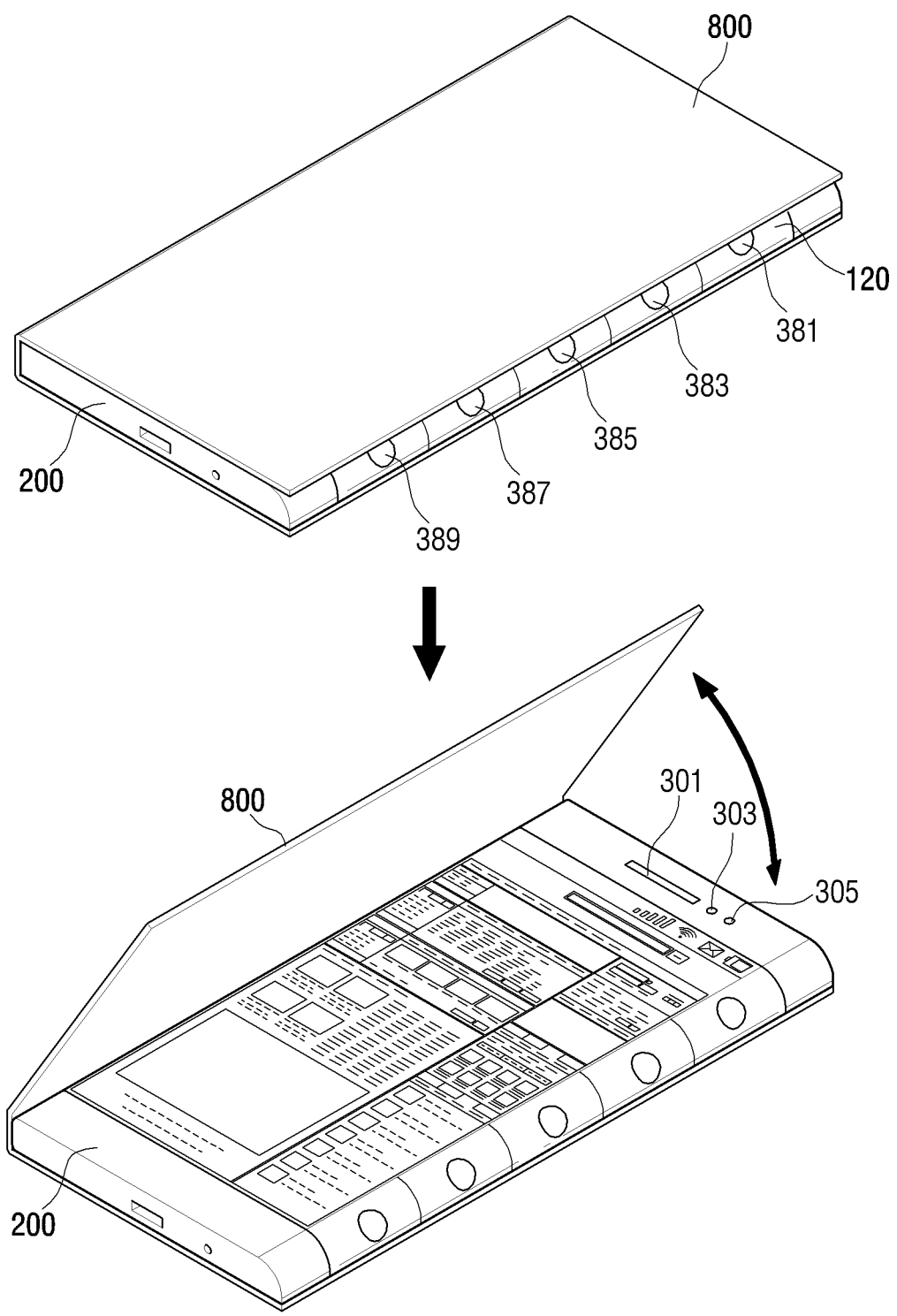
FIGS. 3 to 10 are views illustrating a method of executing an application according to user interaction and opening/closing of a cover at a side display area of the portable terminal having a bended display, according to one or more exemplary embodiments.

Referring to FIG. 3, the front display area of the bended display of the portable terminal 200 is covered by the cover 800, and the side display area 120 is exposed. In the side display area 120, at least one UI element 381, 383, 385, 387, and 389, which correspond to an application, may be displayed. A UI element may be at least one of an icon for executing an application, a graphic or text indicating information regarding an execution result of the application, and a notification message, etc.

Below, the situation in which a plurality of UI elements are displayed on the side display area will be described. However, exemplary embodiments are not limited to this. For example, a situation in which one UI element is displayed on the side display area may also be applied.

According to an exemplary embodiment, while the front display area of the bended display is covered by the cover, UI elements 381, 383, 385, 387, 389 corresponding to an application may be displayed in the side display 120 of the bended display. The UI elements 381, 383, 385, 387, 389 which are displayed on the side display area 120 may be UI elements which correspond to an application that was executed before. For example, when applications "A", "B", "C", "D" and "E" were executed, the UI elements may be an icon corresponding to applications "A", "B", "C", "D" and "E," respectively.

When a user selects at least one UI element from among the plurality of UI elements 381, 383, 385, 387, 389 displayed on the side display area 120, and opens the cover, the controller may detect the touch in the at least one UI element from among the UI elements and the opening of the cover.

According to an exemplary embodiment, a user may select the UI element by touching one UI element from among UI elements 381, 383, 385, 387, 389. That is, when a user selects one UI element, the controller may detect a touch from one UI element. For example, the controller may control the bended display to execute an application corresponding to the UI element 381 selected by a user and display the application execution screen on the front display area 110.

When a user selects two UI elements, the controller may detect a touch from two UI elements.

According to an exemplary embodiment, a user may select the UI element 381 by touching the UI element 381 displayed on the side display area. When a user touches the UI element 381, the controller detects a touch in the side display area 120, and determines whether to execute an application corresponding to the UI element 381 according to an opening/closing of the cover or the degree thereof. The degree of opening/closing of the cover may be indicated with an angle. For example, the cover may be opened by, e.g., 30 degrees, with respect to the front display area or, e.g., 80 degrees, with respect to the front display area.

According to an exemplary embodiment, the controller may receive from the sensor module an electrical signal according to the opening/closing of the cover, and determine the opening/closing of the cover and/or degree thereof.

For example, while the cover is closed, the sensor module may output the electrical signal which corresponds to "0" to the controller. While the cover is opened, the sensor module may output the electrical signal which corresponds to "1" to the controller. The controller, when the sensor module receives the electrical signal corresponding to "0", may determine that the cover is closed. The controller may determine that, when the electrical signal corresponding to "1" is received from the sensor module, the cover is opened. According to an exemplary embodiment, the electrical signals corresponding to "0" and "1" may be substituted with electrical signals of different values.

According to an exemplary embodiment, when the sensor module is an illuminance sensor and the cover is closed, the electrical signal corresponding to "0" may be output. When the cover is opened, the electrical signal corresponding to "1" may be output.

When a cover is closed, the controller may turn off a screen of the front display area of the bended display, and display on the side display area 120 UI elements 381, 383, 385, 387, 389 which correspond to applications. The UI elements 381, 383, 385, 387, 389 which correspond to applications may be icons which execute applications. The UI element 381 may be an icon which executes application "A", the UI element 383 may be an icon which executes application "B", the UI element 385 may be an icon which executes application "C", the UI element 387 may be an icon which executes application "D", and the UI element 389 may be an icon which executes application "E".

According to an exemplary embodiment, when a user touches and selects at least one UI element 381 from among the UI elements 381, 383, 385, 387, 389 displayed on the side display area, and opens the cover, application "A" which corresponds to UI element 381 may be executed, and the execution screen of application "A" may be displayed on the front display area 110.

According to an exemplary embodiment, the controller may receive a coordinate of a place where a touch is detected and determine which UI element corresponds to the coordinate. That is, the controller, based on a touch input of a user, may determine which UI element is selected based on a touch input, and execute an application corresponding to the UI element. According to an exemplary embodiment, the controller may control the bended display so that the application execution screen is displayed on the front display area.

Figure 4:
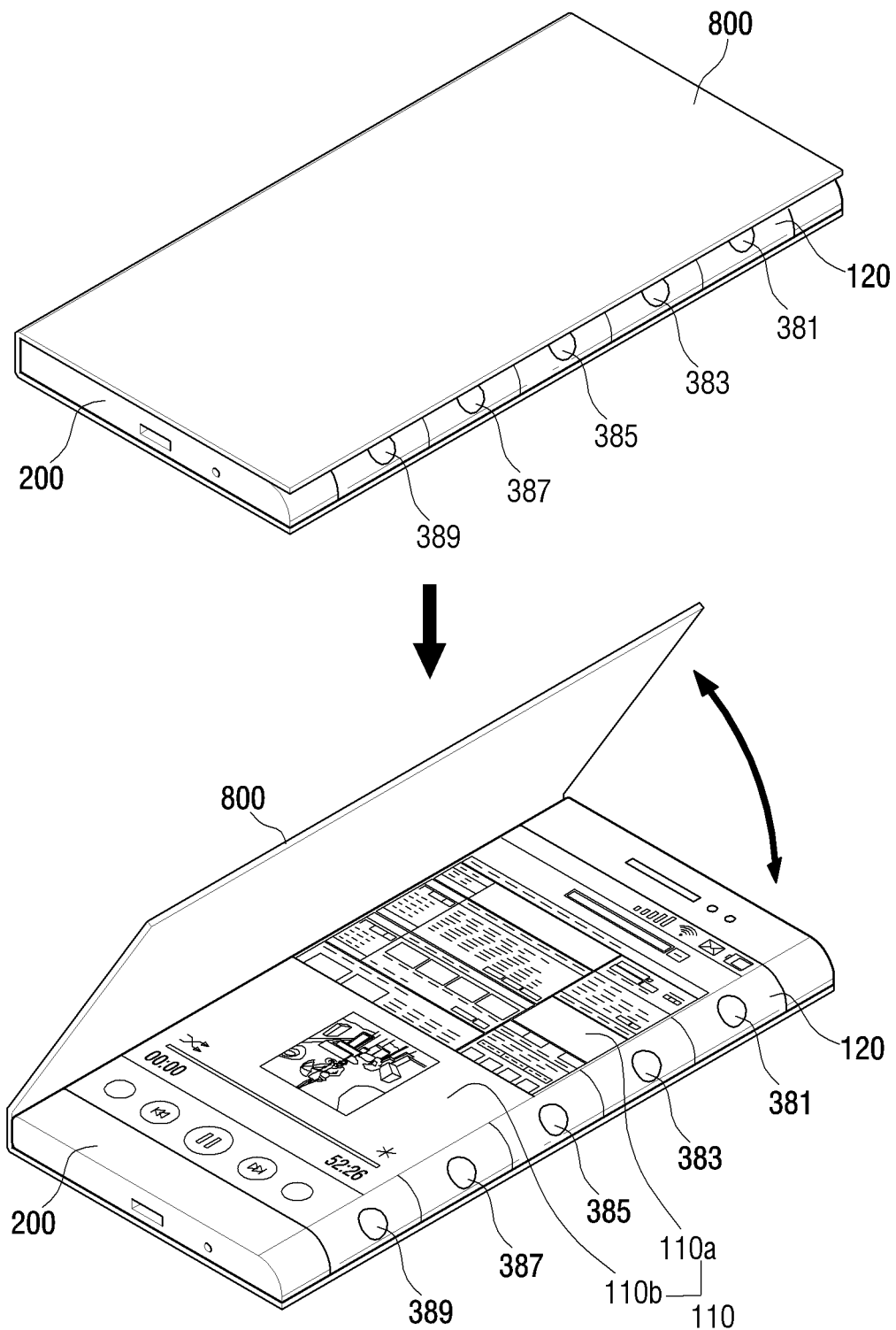

Referring to FIG. 4, the front display area 110 of the bended display of the portable terminal 200 is covered by the cover 800, and the side display area 120 is exposed. On the side display area 120, UI elements 381, 383, 385, 387, 389, which correspond to the applications, may be displayed. The UI elements 381, 383, 385, 387, 389 may be icons for executing applications. According to an exemplary embodiment, the UI element may be a graphic or a text which indicates information regarding an application execution result.

While the cover is closed, the plurality of UI elements 381, 383, 385, 387, 389 can be displayed on the side display area 120. The UI elements which are displayed on the side display area 120 may be one or more icons corresponding one or more applications which were executed before.

According to an exemplary embodiment, a user may concurrently touch and select two or more UI elements from among UI elements displayed in the side display area 120. While a user selects a plurality of UI element e.g., 381 and 385, from among UI element 381, 383, 385, 387, 389 displayed in the side display area 120, and opens the cover 800, the applications which correspond to the selected plurality of UI element 381, 385 is executed, and the application execution screen may be displayed on the front display area 110. In this example, in the front display area 110, a plurality of windows 110a, 110b may be displayed. In each window, the application execution screens may be displayed respectively. The window may be screens which are divided.

In one window 110a from among a plurality of windows 110a, 110b, an application execution screen corresponding to the UI element 381 is displayed, and in another window 110b, an application execution screen corresponding to the UI element 385 may be displayed. Each application can be executed by multi-tasking.

According to an exemplary embodiment, if three UI elements are selected when the cover is opened, three windows may be displayed on the front display area. As another example, if three UI elements are selected when the cover is opened, two windows may be displayed on the front display area, and two applications may be displayed in each of the windows, respectively. A third application may be displayed on the side display area.

For example, if a user selects two UI elements from among UI elements displayed in the side display area 120 and opens a cover, two applications corresponding to selected two UI elements are executed and an application execution screen may be displayed on the front display area. Two applications may be displayed as two windows. In other words, the front display area may be split to two top/bottom or two left/right screens and be displayed in a split screen (window).

If a user selects three UI elements and opens the cover, three applications which correspond to the selected three UI elements may be executed, and three application execution screens may be displayed on the front display area. Three applications can be displayed as three windows. That is, the front display area may be split into three top/bottom or three left/right screens and displayed in respective three-way split screens (windows).

According to an exemplary embodiment, the controller may receive information regarding the opening/closing of the cover from the sensor module and/or a degree thereof, and determine an opening/closing of the cover and/or a degree thereof. For example, while the cover is closed, the sensor module may output the electrical signal which corresponds to "0" to the controller. While the cover is opened, the sensor module may output the electrical signal corresponding to "1" to the controller. The controller, in the sensor module, when the electrical signal corresponding to "0" is received, may determine that the cover is closed. The controller, in the sensor module, when the electrical signal corresponding to "1" is received, may determine that the cover is opened.

In a case in which the cover is closed, the controller may turn off the front display area of the bended display and display UI elements 381, 383, 385, 387, 389 corresponding to the application on the side display area 120. The UI element 381 may be an icon which executes application "A", the UI element 383 may be an icon which executes application "B", the UI element 385 may be an icon which executes application "C", UI element 387 may be an icon which executes application "D", and the UI element 389 may be an icon which executes application "E".

If a user touches and selects a plurality of UI elements, e.g., 381 and 385, and opens a cover, application "A" and "C" which correspond to UI elements 381, 385 are executed, and the execution screen of applications "A", "C" may be displayed on the front display area 110.

In this example, in the front display area 110, two windows 110a, 110b may be displayed, and on each window, application execution screens may be displayed. In other words, in the window 110a, the execution screen of application "A" may be displayed, and the execution screen of application "C" may be displayed on the window 110b.

For example, while the cover of the portable terminal is closed, if a music player icon and a gallery icon displayed on the side display area are selected and the cover is opened, two windows may be displayed on the front display area at a lower end and an upper end. In the upper end window, the music player execution screen may be displayed, and in the lower end window, the gallery application execution screen may be displayed.

Figure 5:
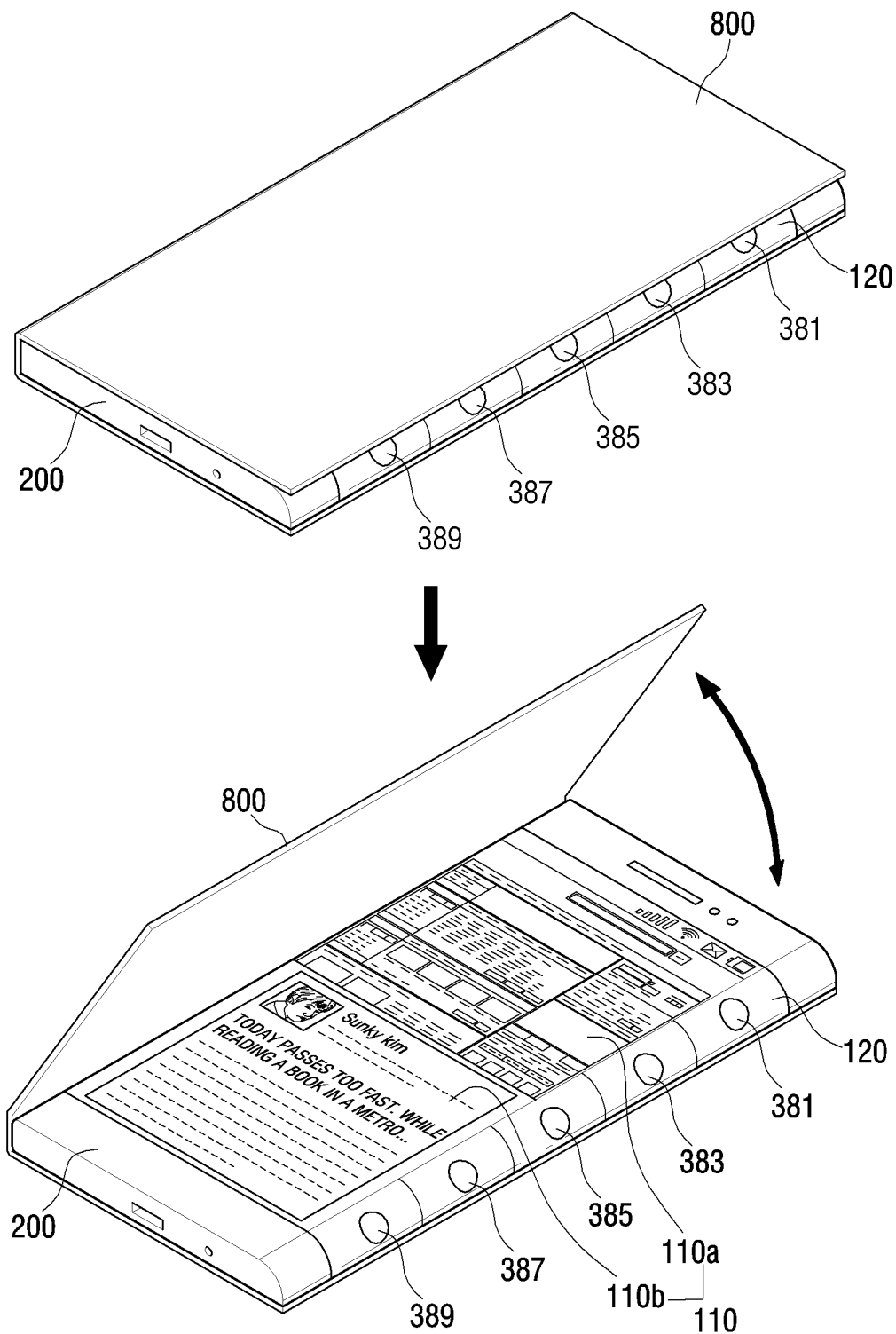

Referring to FIG. 5, while the front display area 110 of the bended display of the portable terminal 200 is covered by the cover 800, the side display area 120 is exposed. In the side display area 120, UI elements 381, 383, 385, 387, 389 corresponding to applications may be displayed. Each UI element may be an icon for executing the application. According to an exemplary embodiment, each UI element may be graphic and a text indicating information regarding an execution result of an application. According to an exemplary embodiment, each UI element may be a notification message.

While the cover is closed and the first application is being executed, one or more UI elements 381, 383, 385, 387, 389 are displayed on the side display area 120. The first application may have already been executed before one of the UI elements displayed on a side is selected.

According to an exemplary embodiment, the UI element 381 is an icon which executes application "A", the UI element 383 is an icon which executes application "B", the UI element 385 is an icon which executes application "C", the UI element 387 is an icon which executes application "D", and the UI element 389 is an icon which executes application "E".

Before the cover is opened in the portable terminal, when the first application is being executed, the execution screen of the second application, which corresponds to the selected UI element, and the execution screen of the first application, which is being executed, may be concurrently displayed on the front display area.

In other words, before the cover is opened in the portable terminal, when the first application is already executed and a user selects the UI element 383 from among UI elements 381, 383, 385, 387, 389 displayed on the side display area 120, and then opens the cover, two windows 110a, 110b may be displayed on the front display area 110. In the window 110a, the execution screen of the first application which is already executed is displayed, and in the window 110b, the execution screen of the second application which corresponds to the UI element 383 may be displayed.

For example, while the cover 800 is closed, if the music application is being executed when a user touches a UI element which corresponds to the gallery application in the side display area 120, and then opens the cover while maintaining the touch, the execution screen of the music application and the execution screen of the gallery application can be displayed on the front display area. The music application and the gallery application may be displayed on two windows, respectively. The execution screen of music application which is already executed may be displayed on an upper end window, and the execution screen of the gallery application which is executed later may be displayed on a lower end window.

According to an exemplary embodiment, the application which is executed before the cover is opened may be displayed on an upper end window, and the application which is executed while the cover is opened may be displayed on a lower end window. However, it is not limited to this. The opposite is also available. For example, the application which is executed before the cover is opened may be displayed on a lower end window, and the application which is executed while the cover is opened may be displayed on an upper end window.

According to an exemplary embodiment, the controller may receive information regarding the opening/closing of the cover from the sensor module, and determine the opening/closing of the cover and/or the degree thereof.

For example, while the cover is closed, the sensor module may output the electrical signal which corresponds to "0" to the controller. While the cover is opened, the sensor module may output the electrical signal which corresponds to "1" to the controller. The controller, when the sensor module receives the electrical signal corresponding to "0", may determine that the cover is closed. The controller may determine that, when the electrical signal corresponding to "1" is received from the sensor module, the cover is opened.

When a cover is closed, the controller may turn off a screen of the front display area of the bended display, and display on the side display area 120 UI elements 381, 383, 385, 387, 389 which correspond to applications.

When a user touches and selects at least one UI element, e.g., 383, from among the UI elements 381, 383, 385, 387, 389 displayed on the side display area, the controller determines whether there is an application which is being executed. When the first application is being executed, the controller may split the execution screen of the first application and the execution screen of the second application which corresponds to the UI element 383 into two windows of the front display area and concurrently display them. The controller may display an execution screen of the first application on the upper end window 110a and an execution screen of the second application on the lower end window 110b.

Figure 6:
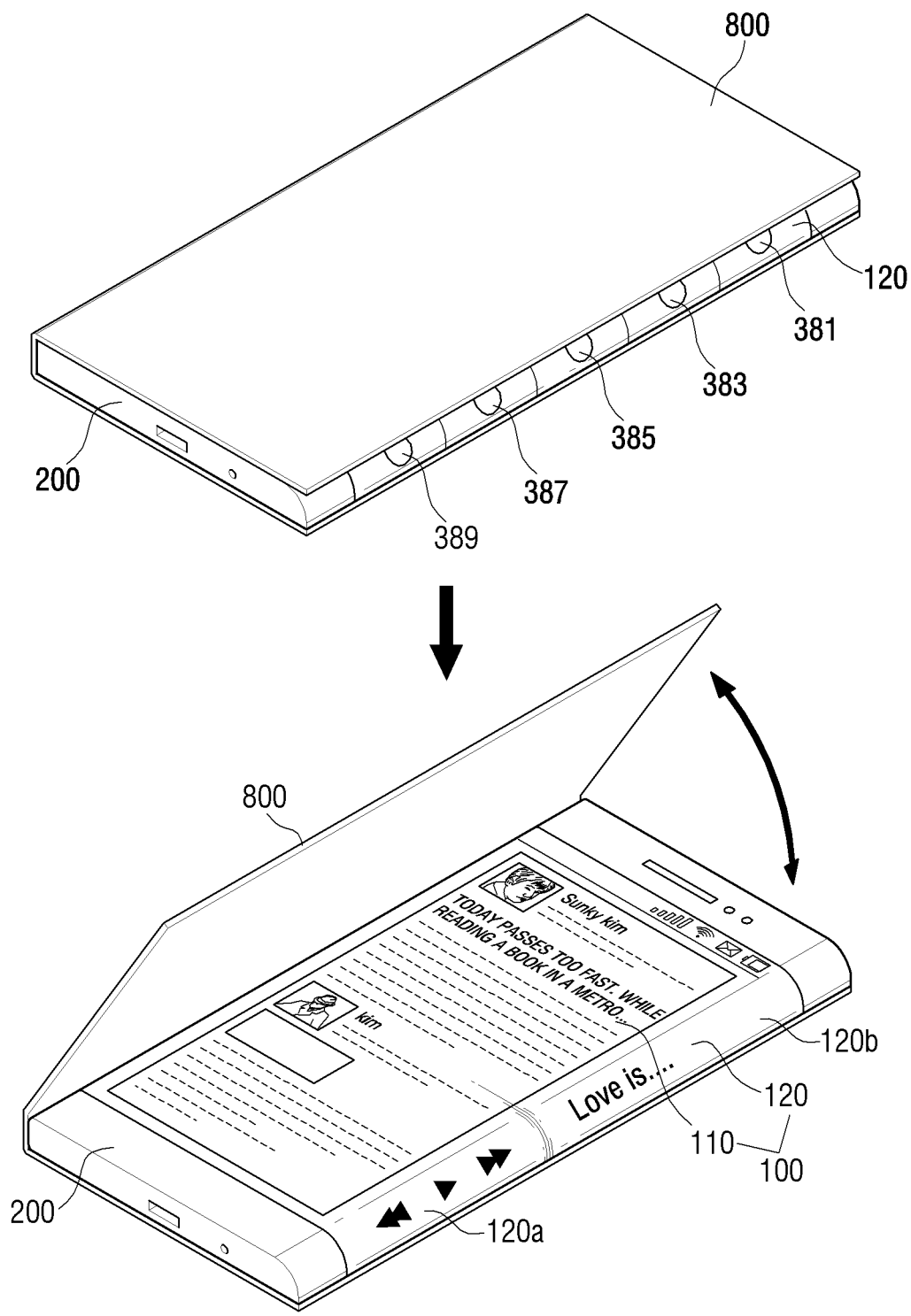

Referring to FIG. 6, the front display area of the bended display of the portable terminal 200 is covered by the cover 800, and the side display area 120 is exposed. In the side display area 120, at least one UI element 381, 383, 385, 387, 389 which correspond to applications may be displayed. According to an exemplary embodiment, a UI element may be an icon for executing an application, a graphic or text indicating information regarding an execution result of the application, and/or a notification message.

Before the cover is opened in the portable terminal, when the first application is being executed, the execution screen of the first application may be displayed on the side display area 120, and the execution screen of the selected UI element can be displayed on the front display area.

While the cover is closed, UI element 381, 383, 385, 387, 389 are displayed on the side display area 120. If a user selects one UI element, e.g., 381, from among UI elements 381, 383, 385, 387, 389 displayed on the side display area, and then opens the cover, the second application corresponding to the UI element 381 may be executed, and the execution screen of the second application may be displayed on the front display area 110. In this case, when there is the first application which is being executed before the cover is opened, the first application may be displayed on the side display area 120.

For example, while the cover is closed and the first application is being executed, if a user touches the UI element 381 corresponding the second application and opens the cover while maintaining the touch, the execution screen of the second application may be displayed on the front display area, and the execution screen of the first application may be displayed on the side display area. The side display area has a display area which is comparatively smaller than the front display area, and therefore, the execution screen of the first application may be displayed as an abbreviated form on the side display area.

According to an exemplary embodiment, if the first application is a music application, a title of a song which is being played can be scrolled and displayed on the side display area. If the first application is a gallery application, a thumbnail image and a title can be displayed on the side display area.

The controller, when the first application is being executed while the cover is closed, may detect a user input to select the UI element in the side display area where the UI element is displayed and detect an opening of the cover, and may display an execution screen of the second application corresponding to the selected UI element in the front display area 110, and display an execution screen of the first application which has been executed before the cover is opened, on the side display area. An abbreviated execution screen of the first application may be displayed on the side display area.

Figure 7:
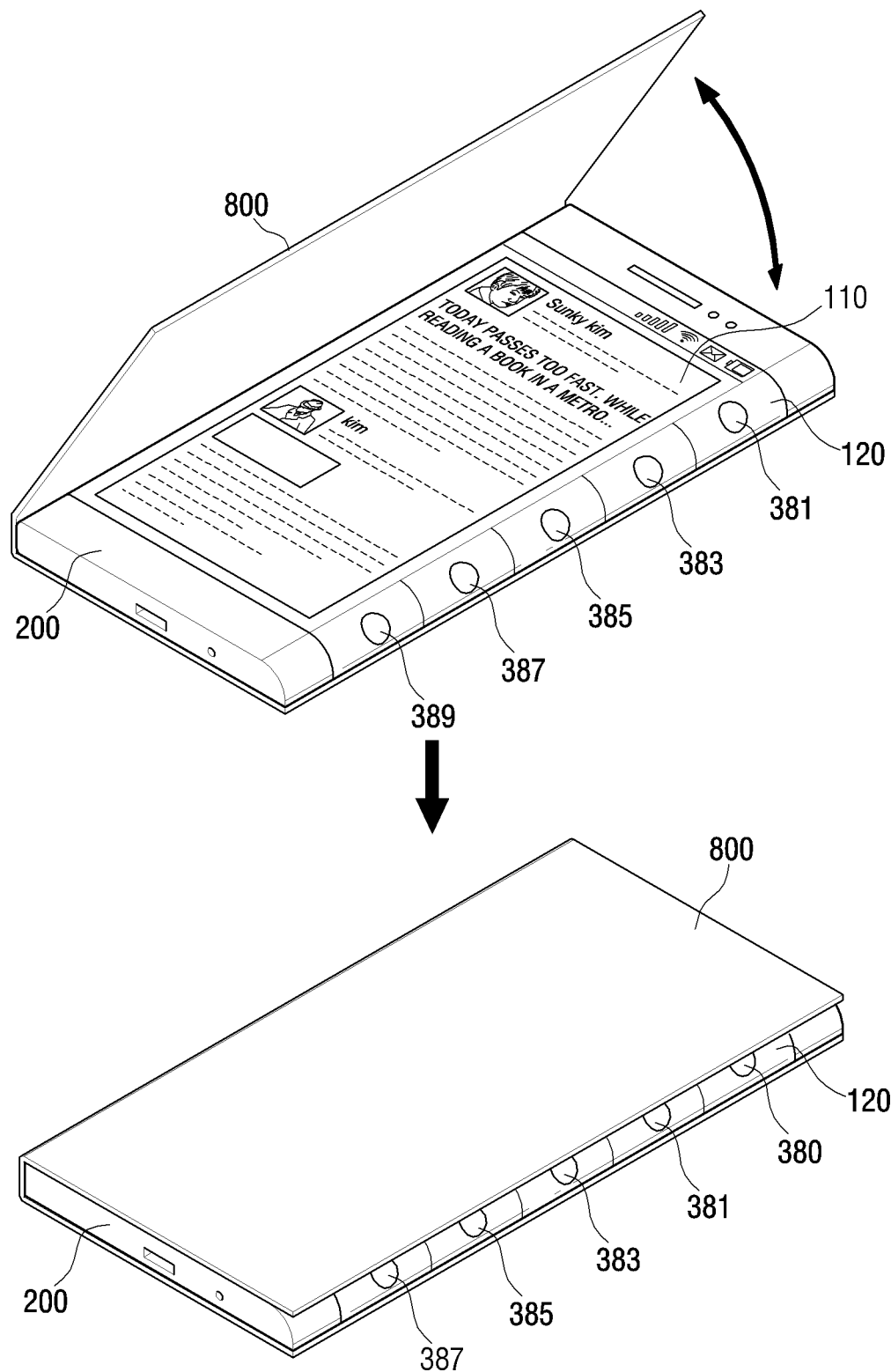

Referring to FIG. 7, while the cover 800 of the portable terminal 200 is opened, an execution screen of the first application is displayed on the front display area 110. On the side display area 120, UI elements 381, 383, 385, 387, 389 corresponding to applications may be displayed. According to an exemplary embodiment, the UI element may be graphic and text indicating information regarding an execution result of an application. According to an exemplary embodiment, the UI element may be a notification message.

UI elements 381, 383, 385, 387, 389 may be icons which correspond to applications which were executed in the past, or may be arranged in the temporal order of execution and displayed on the side display area. For example, they can be displayed on a right side of the side display area in the order of most recent execution. In other words, from the right side of the side display area, UI elements can be displayed in the order of the UI element 381, the UI element 383, the UI element 385, the UI element 387, and the UI element 389. The UI element 381 is most recently executed, and the UI element 389 is the least recently executed.

If the cover 800 is opened while an execution screen of the first application is displayed on the front display area 110, and the user closes the cover, an execution screen of the first application displayed on the front display area 110 may be displayed on the side display area 120. For example, the UI element 380 which corresponds to the first application may be displayed on the side display area 120. At this time, the first application can be executed as a background. According to an exemplary embodiment, UI elements 381, 383, 385, 387 which were displayed on the side display area may be shifted in a left direction one by one, and the UI element 389 may disappear from the side display area. The UI element 380 which corresponds to the first application that was displayed on the front display area 110 can be displayed on the rightmost of the side display area. In other words, the UI element 380 which corresponds to the first application can be arranged to be the most recently executed in temporal order and displayed. When the cover is closed, the UI element 380 is displayed on the rightmost part of the side display area 120, and on the left side, UI element 381, UI element 383, UI element 385, and UI element 387 may be displayed. The UI element 389 may disappear from the side display area.

According to an exemplary embodiment, the reverse situation may occur. For example, the UI element 380 which corresponds to the first application which was displayed on the front display area may be displayed at the leftmost part of the side display area, and UI elements 381, 383, 385, 387 may be displayed in sequence to the right.

According to an exemplary embodiment, UI elements 381, 383, 385, 387 displayed on the side display area may be displayed in the order of recent execution.

According to an exemplary embodiment, the controller, when the cover is closed according to an attribution (e.g., characteristic) of the first application, may determine whether to display an execution of the first application on the side display area or to display the UI element corresponding to the first application.

For example, in a case in which the first application is a primarily visual application, when the cover is closed, the controller may control the bended display to stop execution of the first application, and display the UI element corresponding to the first application on the side display area 120.

According to an exemplary embodiment, if the first application is a primarily sound-based application, when the cover is closed, the controller may control the bended display to display an execution screen of the first application on the side display area 120. For example, in the side display area 120, a UI element for controlling a volume, and play/stop buttons may be displayed.

If the first application is a combination visual and sound application, the controller may control the bended display to display an execution screen of the first application on the side display area 120 according to a closing of the cover, partly limit processing visual information, and display UI elements corresponding to sound information on the side display area.

The application attribute information regarding a visual application or a sound application, or a combination visual and sound application, can be prestored in an application, and provided upon the execution of an application. According to an exemplary embodiment, the application attribute information can be changed and/or added by a user.

Examples of the visual applications might include a news application, a weather application, a web browser, and a gallery application, etc.

An example of a sound application might include a music player application, etc.

Examples of a combination visual and sound application might include a video reproduction application, etc.

For example, if a cover is opened as a web browser is being executed, and then a user closes a cover, execution of the web browser may be stopped, and a UI element corresponding to a web browser may be displayed on the side display area 120.

According to an exemplary embodiment, if a cover is opened as a music player application is being executed, and then a user closes a cover, the music player application may keep executing, and in the side display area 120, a reproduction button (e.g., play button), a stop button, a fast forward button, a rewind button, a volume control button, and information about music which is currently playing can be displayed.

According to an exemplary embodiment, if a cover is opened as a movie reproduction application is being executed, and then a user closes a cover, a screen of the front display area 110 is turned off and processing of sight information is stopped, but processing of sound information continues. In the side display area 120, a reproduction button, a stop button, a fast forward button, a rewind button, a volume control button, and information on a file currently playing may be displayed.

Figure 8:
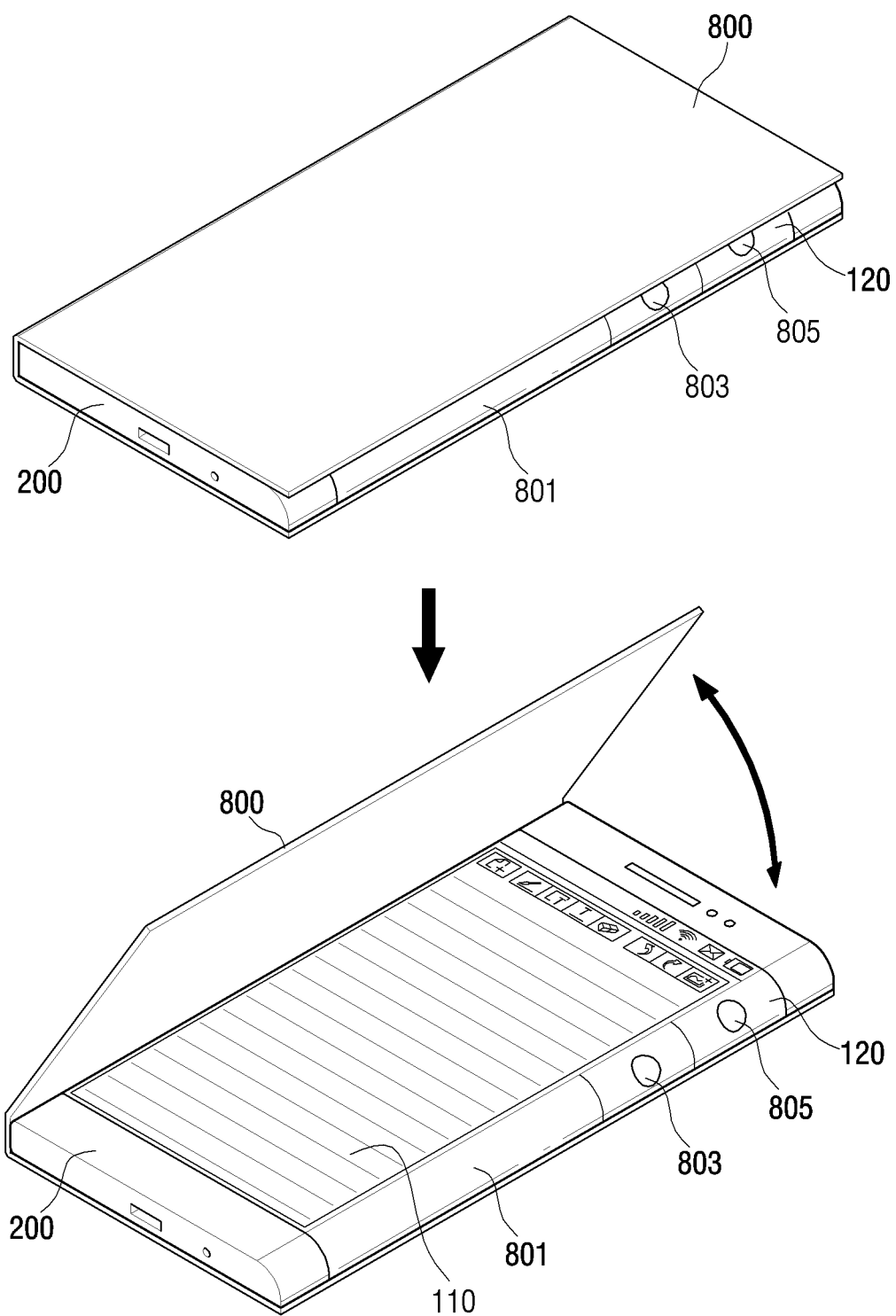

Referring to FIG. 8, the front display area 110 of the bended display of the portable terminal 200 is covered with the cover 800 and the side display area 120 is exposed. On the side display area 120, UI elements 801, 803, 805 may be displayed.

According to an exemplary embodiment, the UI element 801 may be a notification message. The UI element 803 may be a UI element which corresponds to the first application related to the notification message. The UI element 805 may be a UI element which corresponds to the second application related to a notification message. For example, if the notification message 801 is an e-mail, the UI element 803 may be a UI element which corresponds to an application that can open files (e.g., image, video, and document) attached to the notification message. The UI element 805 may be a UI element which corresponds to an application that may send a reply mail in response to the notification message.

If the cover 800 is closed when a notification message arrives, summary information 801 of the notification message can be displayed on a side sub display. Summary information may be scrolled from a left side to a right side or a right side to a left side. If a notification message includes an attached file, the UI element 803 which corresponds to the attached file may be displayed. If a user opens a cover while the user touches the UI element 803, an attached file may be displayed on the front display area 110, as the cover is opened. If the attached file is an image file, the UI element 803 which corresponds to an image file can be displayed on the side display area 120. If the cover 800 is opened while touching the UI element 803 and maintaining the touch, an image viewer application may be executed, and an image can be displayed on the front display area 110. If the attached file is a video file, the UI element 803 corresponding to a video file can be displayed on the side display area 120, and if the cover is opened while the UI element 803 is touched and the touch is maintained a video file can be reproduced on the front display area 110. If the attached file is a text document, the UI element 803 which corresponds to the text document may be displayed on the side display area, and if the cover is opened while the UI element 803 is touched and the touch is maintained, a document may be displayed on the front display area 110.

According to an exemplary embodiment, the UI element 805 may be an icon which corresponds to another application related to the notification message. For example, the UI element 805 may be a telephone number or an e-mail address related to the notification message. If the cover is opened while the UI element 805 is touched, a screen for calling may be displayed on the front display area 110. According to an exemplary embodiment, if the cover is opened while the UI element 805 is touched, a screen for sending a mail can be displayed on the front display area 110.

Figure 9:
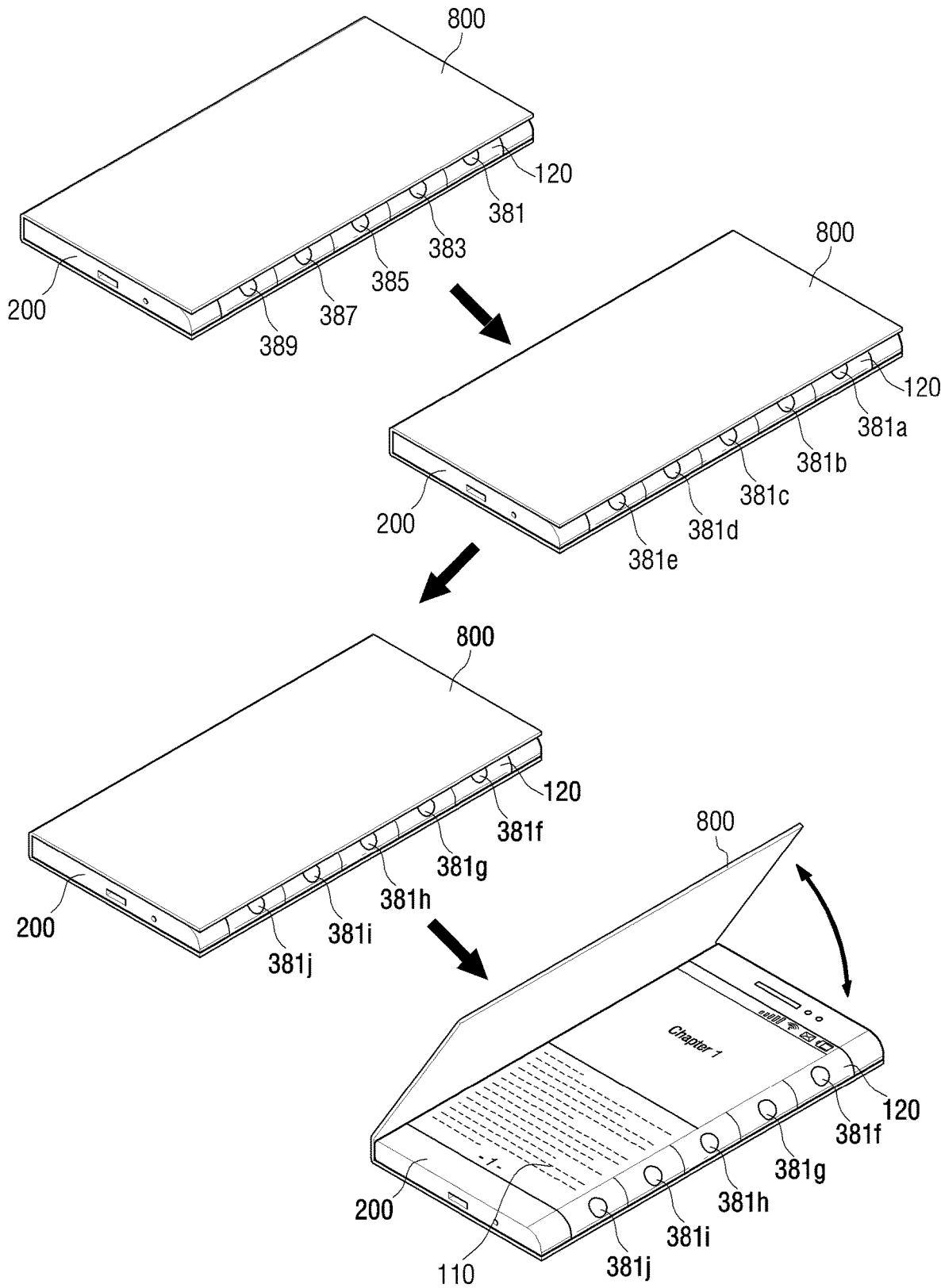

Referring to FIG. 9, the front display area of the bended display of the portable terminal 200 is covered with the cover 800 and the side display area 120 is exposed. On the side display area 120, UI element 381, 383, 385, 387, 389 corresponding to an application may be displayed. According to an exemplary embodiment, the UI element may be an icon for executing an application, a graphic or a text indicating information about an execution result of an application, and/or a notification message.

While the cover 800 is closed, one or more UI elements 381, 383, 385, 387, 389 can be displayed on the side display area 120. According to an exemplary embodiment, the UI element 381 may be an icon which executes application "A", the UI element 383 may be an icon which executes application "B", the UI element 385 may be an icon which executes application "C", the UI element 387 may be an application which executes application "D", and the UI element 389 may be an icon which executes application "E".

If a user does a long touch on one UI element, e.g., 381, from among UI elements 381, 383, 385, 387, 389 displayed on the side display area, a sub menu of the application which corresponds to the UI element 381 may be displayed. A long touch indicates that a touch is done for a predetermined time continuously (e.g., a touch can be maintained for 1 or 2 seconds).

If the application "A," which corresponds to the UI element 381, has a menu with a hierarchical structure, by doing a long touch on the UI element 381 displayed on the side display area 110, movements among the hierarchical structure of the application "A" can be done. A menu having a hierarchical structure may have at least one sub menu or an upper menu.

Figure 10:
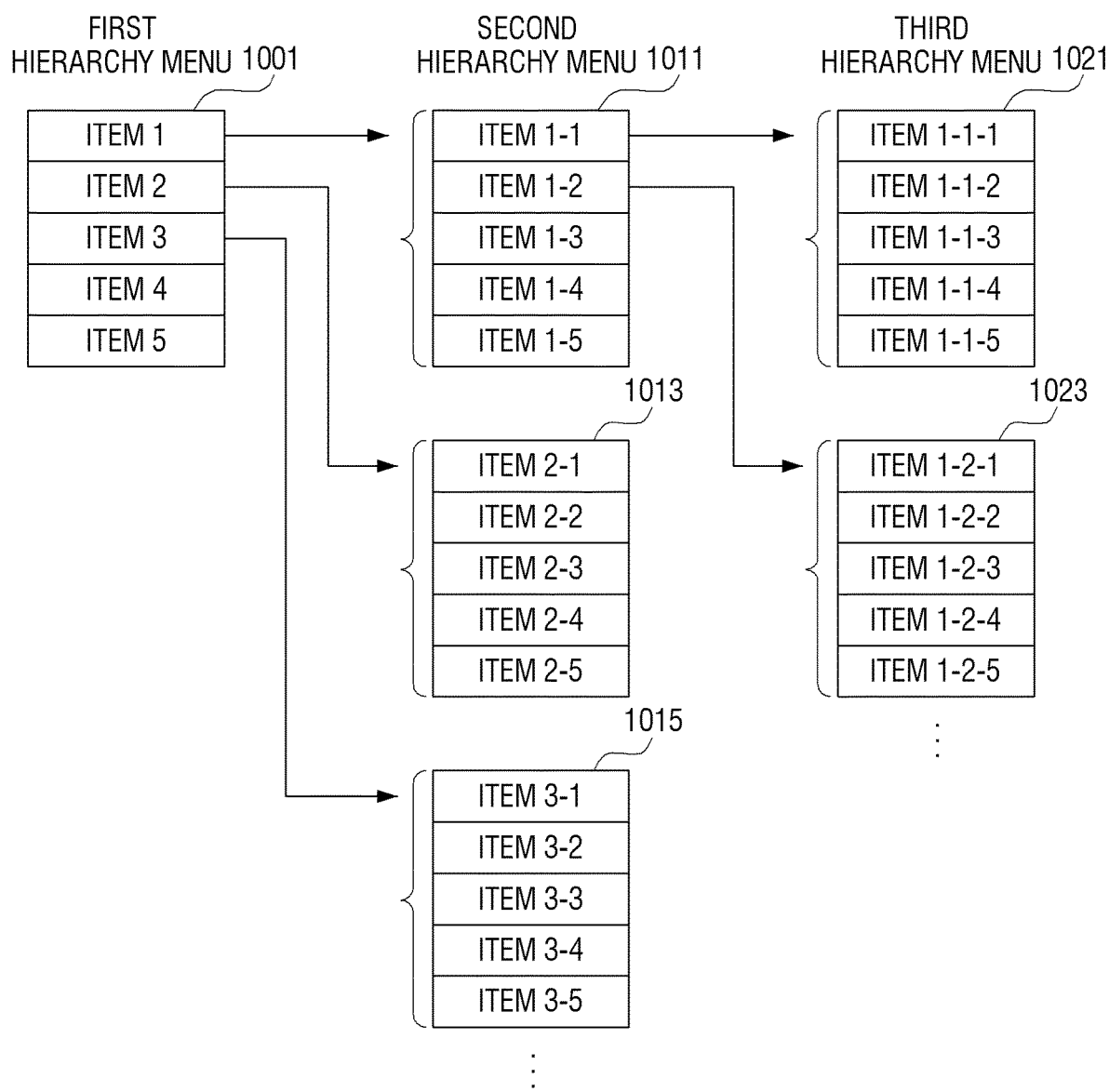

FIG. 10 is a view illustrating a menu having a hierarchical structure. The menu having a hierarchical structure may have a first hierarchy menu 1001, a second hierarchy menu 1011, 1013, 1015, . . . and a third hierarchy menu 1021, 1023, . . . . The first hierarchy menu 1001 may have 'item 1', 'item 2', 'item 3', 'item 4', and 'item 5'.

The 'item 1' may have the second hierarchy menu 1011. The 'item 2' may have the second hierarchy menu 1013. The 'item 3' may have the second hierarchy menu 1015.

The second hierarchy menu 1011 may have 'item 1-1' to 'item 1-5'. The second hierarchy menu 1013 may have 'item 2-1' to 'item 2-5'. The second hierarchy menu 1015) may have 'item 3-1' to 'item 3-5'.

'Item 1-1' of the second hierarchy menu 1011 may have the third hierarchy menu 1021, 1023. The third hierarchy menu 1021, 1023 may be a sub menu of the second hierarchy menu 1011, 1013, and 1015. The third hierarchy menu 1021 may include 'item 1-1-1' to 'item 1-1-5'. The third hierarchy menu 1032 may have 'item 1-2-1' to 'item 1-2-5'.

Referring to FIG. 9, if a user, while the cover is closed, makes a long touch on one UI element 381 from among the UI elements displayed on the side display area 120, UI elements 381a, 381b, 381c, 381d, 381e, which may select a menu item of application "A" which corresponds to the UI element 381, may be displayed on the side display area 120. For example, UI elements 381a, 381b, 381c, 381d, 381e, which may select menu 'item 1' to 'item 5' corresponding to the first hierarchy menu 1001 of FIG. 10 may be displayed.

When the UI element 381a is touched, 'item 1' of the first hierarchy menu 1001 may be selected. When the UI element 381b is touched, 'item 2' of the first hierarchy menu 1001 may be selected. When the UI element 381c is touched, 'item 3' of the first hierarchy menu 1001 may be selected UI element. When the UI element 381d is touched, 'item 4' of the first hierarchy menu 1001 may be selected. When the UI element 381e is touched, 'item 5' of the first hierarchy menu 1001 may be selected.

During this state, when a user makes a long touch of the UI element 381a, UI elements 381f, 381g, 381h, 381i, 381j which correspond to a sub menu of the UI element 381a may be displayed on the side display area 120.

When the UI element 381f is touched, 'item 1-1' of the first hierarchy menu 1011 may be selected. When the UI element 381g is touched, 'item 1-2' of the first hierarchy menu 1011 may be selected. When the UI element 381h is touched, 'item 1-3' of the first hierarchy menu 1011 may be selected UI element. When the UI element 381*i* is touched, 'item 1-4' of the first hierarchy menu 1011 may be selected. When the UI element 381*j* is touched, 'item 1-5' of the first hierarchy menu 1011 may be selected.

According to an exemplary embodiment, if a user touches and selects the UI element 381*f* displayed on a side sub display area 120, and opens a cover, a function corresponding to the UI element 381*f* may be executed and an execution screen may be displayed on the front display area 110.

For example, if an application which corresponds to the UI element 381 is an e-book, when the UI element 381 is long touched, UI elements 381*a*, 381*b*, 381*c*, 381*d*, 381*e* which correspond to an index that is a sub menu of the e-book can be displayed on the side display area 120. When a user long touches the UI element 381*a* again, UI elements 381*f*, 381*g*, 381*h*, 381*i*, 381*j*, which correspond to a chapter that is a sub menu of the UI element 381*a*, may be displayed on the side display area 120.

When the UI element 381*f* is touched and selected, 'chapter 1' can be selected. When the UI element 381*g* is touched and selected, 'chapter 2' can be selected. When the UI element 381*h* is touched and selected, 'chapter 3' can be selected. When the UI element 381*i* is touched and selected, 'chapter 4' is selected. When the UI element 381*j* is touched and selected, 'chapter 5' is selected.

If a user opens the cover while touching the UI element 381*f*, a corresponding chapter 1 is selected, and the page may be displayed on the front display area. That is, the controller may receive a touch input at the UI element 381*f*, and may control the bended display so that the page corresponding to chapter 1 is displayed on the front display area based on the touch input.

If a user opens the cover while touching the UI element 381*g*, a corresponding chapter 2 is selected, and the page can be displayed on the front display area. That is, the controller may control the bended display to receive a touch input in the UI element 381*g* and the page corresponding to chapter 2 is displayed on the front display area based on the touch input.

If a user opens the cover while touching the UI element 381*h*, a corresponding chapter 3 is selected, and the page can be displayed on the front display area. That is, the controller may control the bended display to receive a touch input in the UI element 381*h* and the page corresponding to chapter 3 is displayed on the front display area based on the touch input.

If a user opens the cover while touching the UI element 381*i*, a corresponding chapter 4 is selected, and the page can be displayed on the front display area. That is, the controller may control the bended display to receive a touch input in the UI element 381*i* and the page corresponding to chapter 4 is displayed on the front display area based on the touch input.

If a user opens the cover while touching the UI element 381*j*, a corresponding chapter 5 is selected, and the page can be displayed on the front display area. That is, the controller may control the bended display to receive a touch input in the UI element 381*j* and the page corresponding to chapter 5 is displayed on the front display area based on the touch input.

According to an exemplary embodiment, user inputs are divided into a touch and a long touch, and a function corresponding to the UI element is executed or a sub menu item is displayed on the side display area. However, user inputs are not limited to a touch and a long touch, and the touch and the long touch may be replaced or supplemented with other user inputs such as a flick gesture, drag gesture, tap, double tap, or the like.

The controller, if the UI element is an icon for executing an application, may control the bended display to divide user inputs input to the UI element, execute an application corresponding to the UI element, or display a menu item of an application corresponding to the UI element in the side display area 120.

According to an exemplary embodiment, the controller, if the UI element is a menu item, may control the bended display to divide user inputs input to the UI element, select a function corresponding to the UI element, or display a sub menu item corresponding to the UI element on the side display area 120.

Figure 11:
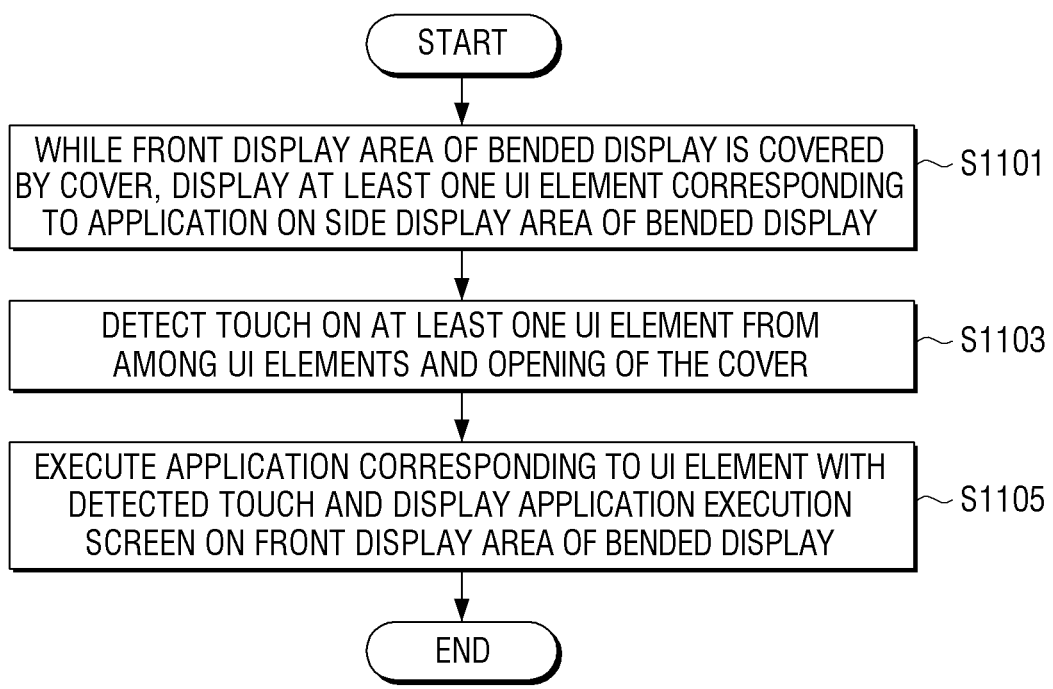
FIGS. 11 and 12 are flowcharts illustrating a process of handling an application by detecting a UI element displayed in a side display area and opening of a cover, according to one or more exemplary embodiments.
Figure 12:
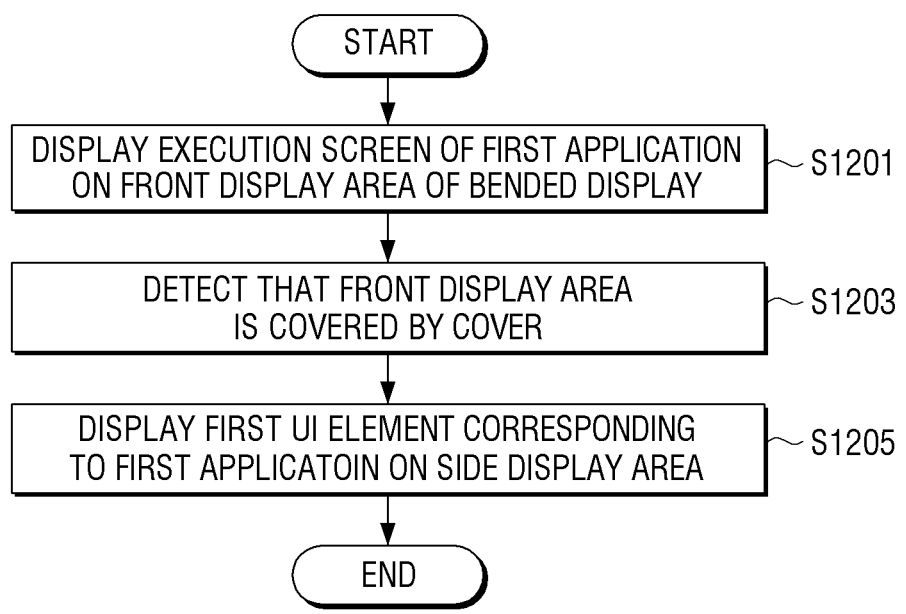

FIGS. 11 and 12 are flowcharts illustrating a process of detecting the UI element displayed on the side display area, detecting an opening of a cover, and processing an application.

Referring to FIG. 11, the portable terminal having the bended display includes the front display area and the side display area, and while the front display area of the bended display is covered by the cover, one or more UI elements which correspond to the application of the side display area of the bended display may be displayed (S1101). The UI element may be an icon for executing an application.

The controller 390 may receive an electric signal according to an opening/closing of the cover from the sensor module, and may determine the opening/closing of the cover and/or degree thereof. While the front display area of the bended display is covered, the electrical signal which corresponds to "0" in the sensor module may be outputted. The controller may determine the opening/closing of the cover based on the electrical signal outputted from the sensor module.

On the side display area of the bended display, at least one UI element which corresponds to an application may be displayed. The UI element may be an icon which corresponds to the application that has been executed in the past. According to an exemplary embodiment, the UI elements may be displayed on the side display area in a temporal order of execution.

According to an exemplary embodiment, the portable terminal may detect a touch on at least one UI element from among the UI elements and an opening of the cover (S1103). The controller, when a touch is detected in the UI element displayed on side display area, may receive a coordinate of the place where the touch is detected, and determine which UI element corresponds to the coordinate.

When the cover is opened, the electrical signal which corresponds to "1" can be outputted from the sensor module. According to an exemplary embodiment, the controller may detect the opening of the cover based on the electrical signal which is output from the sensor module.

If an opening of the cover is detected while a touch is detected in the UI element, the portable terminal may execute an application which corresponds to the UI element where the touch is detected, and display an execution screen of the application on the front display area of the bended display (S1105). According to an exemplary embodiment, if a touch is detected from a plurality of UI elements while an opening of the cover is detected, the portable terminal may execute a plurality of applications corresponding to the plurality of UI elements where the touch is detected, and display execution screens of a plurality of applications on the front display area. Execution screens of a plurality of applications can be displayed on one or more windows, respectively.

In the portable terminal, if the first application is being executed before the cover is opened, the execution screen of the second application corresponding to the UI element with the detected touch and the execution screen of the first application which is being executed may be concurrently displayed on the front display area.

According to an exemplary embodiment, if the first application is being executed before the cover is opened, the execution screen of the first application which is being executed may be displayed on the side display area, and the execution screen of a second application corresponding to the UI element with the detected touch may be displayed on the front display area.

According to an exemplary embodiment, if a touch is detected in one UI element, and a duration time of the touch is maintained for more than a predetermined time, a menu item of the UI element with the detected touch may be displayed on the side display area.

According to an exemplary embodiment, the portable terminal may receive a user input for selecting one item from among the menu items, detect an opening of the cover, and perform a function of the application corresponding to the item based on the opening of the cover.

Referring to FIG. 12, the portable terminal having the bended display including the front display area and the side display area may display an execution screen of the first application on the front display area of the bended display (S1201). Also, the portable terminal may display at least one UI element which corresponds to the pre-executed application on the side display area of the bended display.

According to an exemplary embodiment, the portable terminal may detect that the front display area is covered by the cover (S1203), and display the first UI element which corresponds to the first application on the side display area based on the detection result (S1205). At least one UI element which corresponds to the pre-executed application can be aligned and displayed on the side display area according to the application execution order, and the first UI element may be additionally aligned and displayed as the most recently executed.

According to an exemplary embodiment, an application execution method of the portable terminal having the bended display may be realized as a program command which can be executed through computer means, and be recorded in a computer readable recording medium. The recording medium readable via the computer may include solely or in combination of a program command, a data file, a data structure, and the like.

The computer readable medium may include a hard disc, a floppy disc, a magnetic media such as a magnetic tape, Compact Disc Read Only Memory (CD-ROM), optical media such as Digital Versatile Disc (DVD), magneto-optical media such as a floptical disc, Read Only Memory (ROM), Random Access Memory (RAM), and a flash memory which is specially configured hardware device for storing and executing program commands. The program commands may include not only machine codes which are made by a compiler, but also high-level language code which can be executed via computer by using interpreter. The hardware device may be configured to operate as one or more software modules. Conversely, software modules may be configured to operate as a hardware device.

One or more exemplary embodiments are merely exemplary and are not to be construed as limiting the inventive concept. The exemplary embodiments can be readily applied to other types of apparatuses. The description of the exemplary embodiments is intended to be illustrative, and not to limit the scope of the claims, and many alternatives, modifications, and variations should be apparent to those skilled in the art.

What is claimed is:

1. A method for executing an application of a portable terminal having a curved display with a first area and a second area extended from the first area, the first area being a flat area, and the second area being a curved area, the method comprising:
while the first area of the curved display is covered by a cover, displaying a user interface (UI) on the second area of the curved display, wherein the UI on the second area of the curved display comprises a plurality of UI elements corresponding to a plurality of applications installed in the portable terminal;
detecting a touch on a first UI element among the plurality of UI elements displayed in the second area and an opening of the cover covered on the first area of the curved display; and
in response to the detecting of the touch on the first UI element and the opening of the cover, identifying an application which is currently executed on the portable terminal;
based on identification that the application is currently executed on the portable terminal, displaying a first window and a second window simultaneously in the first area of the curved display, wherein the first window is an execution screen of a first application corresponding to the first UI element and the second window is an execution screen of a second application currently executed on the portable terminal;
while the first window corresponding to the first application and the second window corresponding to the second application are displayed on the first area of the curved display, detecting a closing of the cover on the first area of the curved display; and
in response to the closing of the cover on the first area of the curved display, displaying the first UI element corresponding to the first application and a second UI element corresponding to the second application on the second area of the curved display, wherein the first UI element and the second UI element are displayed based on an execution sequence of each of the first application and the second application.

2. The method of claim 1, wherein each of the plurality of UI elements is an icon for executing an application.

3. A portable terminal apparatus comprising:
a curved display comprising a first area and a second area extended from the first area, the first area being a flat area, and the second area being a curved area; and
a controller configured to:
while the first area of the curved display is covered by a cover, control the curved display to display a user interface (UI) on the second area of the curved display, wherein the UI on the second area of the curved display comprises a plurality of UI elements corresponding to a plurality of applications installed in the portable terminal,
detect a touch on a first UI element among the plurality of UI elements displayed on the second area and an opening of the cover covered on the first area of the curved display, in response to the detecting of the touch to on the first UI element and the opening of the cover, identify an application which is currently executed on the portable terminal, based on identification that the application is currently executed on the portable terminal, control the curved display to display a first window and a second window simultaneously on the first area of the curved display, wherein the first window is an execution screen of a first application corresponding to the first UI element and the second window is an execution screen of a second application currently executed on the portable terminal, while the first window corresponding to the first application and the second window corresponding to the second application are displayed on the first area of the curved display, detect a closing of the cover on the first area of the curved display;

in response to the closing of the cover on the first area of the curved display, control the curved display to display the first UI element corresponding to the first application and a second UI element corresponding to the second application on the second area of the curved display, wherein the first UI element and the second UI element are displayed based on an execution sequence of each of the first application and the second application.

4. The apparatus of claim 3, wherein each of the plurality of UI elements is an icon for executing an application.

* * * * *